US012749826B2

(12) United States Patent
Kodate et al.

(10) Patent No.: US 12,749,826 B2
(45) Date of Patent: Sep. 29, 2026

(54) MULTI-ANTENNA ARRANGEMENT AND ITS CONNECTING METHOD

(71) Applicant: Aeterlink Corp., Tokyo (JP)

(72) Inventors: Naoto Kodate, Tokyo (JP); Yuji Tanabe, Tokyo (JP)

(73) Assignee: Aeterlink Corp., Tokyo (JP)

( * ) Notice: Subject to any disclaimer, the term of this patent is extended or adjusted under 35 U.S.C. 154(b) by 0 days.

(21) Appl. No.: 18/686,913

(22) PCT Filed: Aug. 30, 2021

(86) PCT No.: PCT/JP2021/031812
§ 371 (c)(1),
(2) Date: Feb. 27, 2024

(87) PCT Pub. No.: WO2023/032017
PCT Pub. Date: Mar. 9, 2023

(65) Prior Publication Data
US 2024/0380125 A1 Nov. 14, 2024

(51) Int. Cl.
*H02J 50/27* (2016.01)
*H01Q 1/38* (2006.01)
(Continued)

(52) U.S. Cl.
CPC ............ *H01Q 21/062* (2013.01); *H01Q 1/38* (2013.01); *H01Q 1/52* (2013.01); *H01Q 9/285* (2013.01);
(Continued)

(58) Field of Classification Search
CPC .. H01Q 1/36; H01Q 1/38; H01Q 1/52; H01Q 7/00; H01Q 9/16; H01Q 9/28;
(Continued)

(56) References Cited

U.S. PATENT DOCUMENTS 3,680,135 A * 7/1972 Boyer .................... H01Q 21/20 343/750
4,173,019 A * 10/1979 Williams ............. H01Q 9/0407 343/846
(Continued)

FOREIGN PATENT DOCUMENTS

JP H05-175727 A 7/1993
JP 2001-185950 A 7/2001
(Continued)

OTHER PUBLICATIONS

International Search Report of PCT/JP2021/031812 dated Nov. 16, 2021.
(Continued)

*Primary Examiner* — Levi Gannon
(74) *Attorney, Agent, or Firm* — Mattingly & Malur, PC

(57) ABSTRACT

A multi-antenna which is capable of increasing the space efficiency and of avoiding or suppressing the problems of electromagnetic coupling is provided. The multi-antenna include; a substrate; a total of two linear antennas provided in a substantially cross shape to define four regions on the substrate; a total of eight linear antennas that form a substantially cross shape in each of the four regions; a total of four linear antennas provided along four sides of a substantially square shape at outermost positions on the substrate to surround the four regions; and a connecting line provided to connect all of the fourteen linear antennas in a substantially loop shape in a clockwise or anti-clockwise direction.

16 Claims, 19 Drawing Sheets

(51) Int. Cl.

| | |
|---|---|
| ***H01Q 1/52*** | (2006.01) |
| ***H01Q 9/28*** | (2006.01) |
| ***H01Q 21/06*** | (2006.01) |
| ***H01Q 21/26*** | (2006.01) |
| ***H02J 50/40*** | (2016.01) |

(52) U.S. Cl.
CPC ............. *H01Q 21/26* (2013.01); *H02J 50/27* (2016.02); *H02J 50/402* (2020.01)

(58) Field of Classification Search
CPC ...... H01Q 9/285; H01Q 21/06; H01Q 21/061; H01Q 21/062; H01Q 21/20; H01Q 21/24; H01Q 21/26; H01Q 21/28; H01Q 21/30; H02J 50/20; H02J 50/27; H02J 50/402
See application file for complete search history.

(56) References Cited

U.S. PATENT DOCUMENTS

| | | | | | |
|---|---|---|---|---|---|
| 4,673,832 | A | 6/1987 | Murakami et al. | | |
| 6,426,730 | B1 | 7/2002 | Nishizawa et al. | | |
| 11,095,039 | B2 | 8/2021 | Kasahara | | |
| 2003/0132890 | A1* | 7/2003 | Rawnick | H01Q 15/0013 | 343/700 R |
| 2004/0164922 | A1* | 8/2004 | Tran | H01Q 9/28 | 343/757 |
| 2008/0252523 | A1 | 10/2008 | Shibuya et al. | | |
| 2009/0253960 | A1* | 10/2009 | Takenaka | A61B 1/00029 | 600/118 |
| 2009/0278759 | A1 | 11/2009 | Moon et al. | | |
| 2010/0244656 | A1* | 9/2010 | Ito | H01Q 23/00 | 343/843 |
| 2012/0249374 | A1* | 10/2012 | Wang | H01Q 1/38 | 343/700 MS |
| 2013/0307743 | A1* | 11/2013 | Moon | H01Q 21/08 | 343/833 |
| 2016/0156110 | A1 | 6/2016 | Cohen et al. | | |
| 2019/0348759 | A1* | 11/2019 | Walker | H01Q 3/01 | |
| 2020/0403325 | A1* | 12/2020 | Wu | H01Q 21/061 | |
| 2021/0305721 | A1* | 9/2021 | Li | H01Q 21/26 | |
| 2022/0239017 | A1* | 7/2022 | Chainon | H01Q 21/06 | |
| 2023/0006367 | A1* | 1/2023 | Varnoosfaderani | H01Q 21/24 | |
| 2023/0307958 | A1* | 9/2023 | Baba | B64D 47/00 | |

FOREIGN PATENT DOCUMENTS

| | | | |
|---|---|---|---|
| JP | 2004-172906 | A | 6/2004 |
| JP | 2006-352293 | A | 12/2006 |
| JP | 2008-167248 | A | 7/2008 |
| JP | 2010-503356 | A | 1/2010 |
| JP | 2010-041566 | A | 2/2010 |
| WO | 2014/064646 | A2 | 5/2014 |
| WO | 2016/084003 | A1 | 9/2016 |
| WO | 2018/096740 | A1 | 10/2019 |

OTHER PUBLICATIONS

Extended European Search Report received in corresponding European Application No. 21955912.7 dated May 21, 2025.
Costanzo, A. et al., "Energy Autonomous UWB Localization", IEEE Journal of Radio Frequency Identification, Sep. 2017, pp. 228-244, vol. No. 3.
Japanese Office Action received in corresponding Japanese Application No. 2023-544822 dated Oct. 14, 2025.

* cited by examiner

FIG. 1
(A)
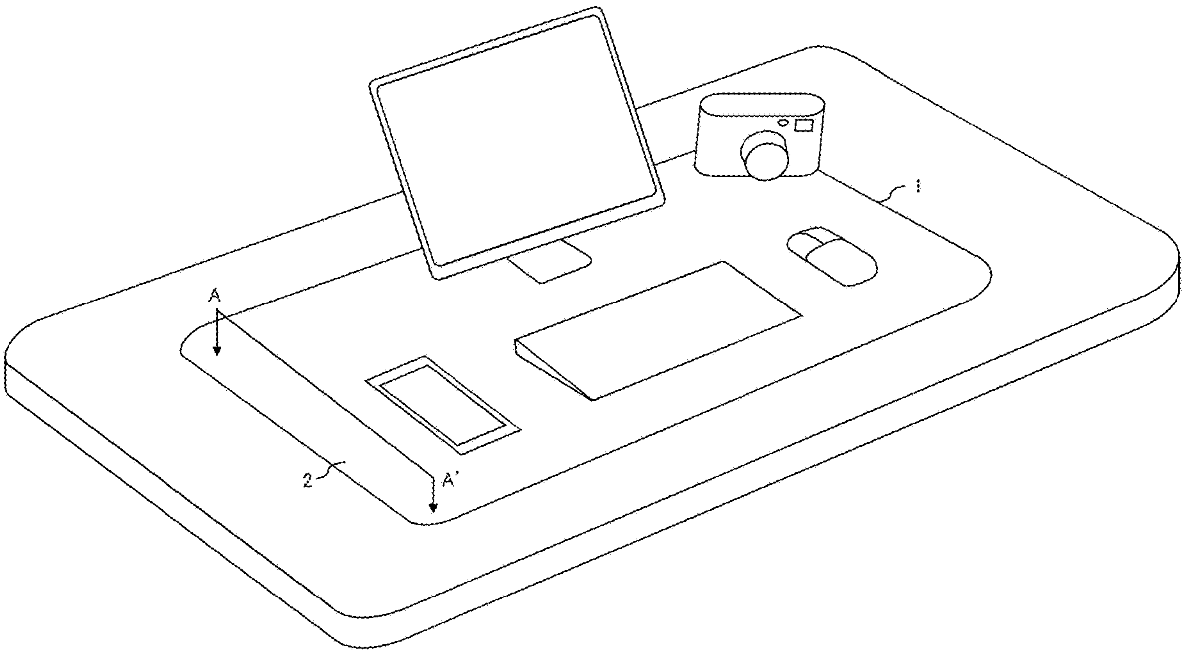
(B)
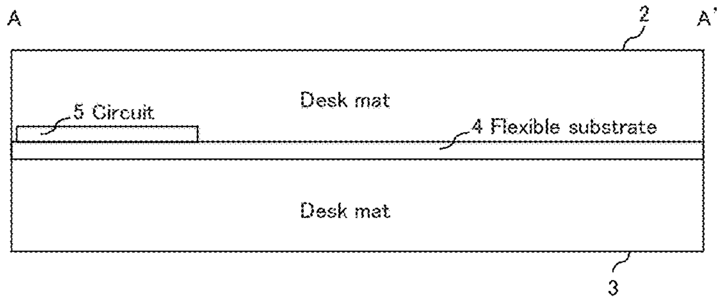

FIG. 2
(A)
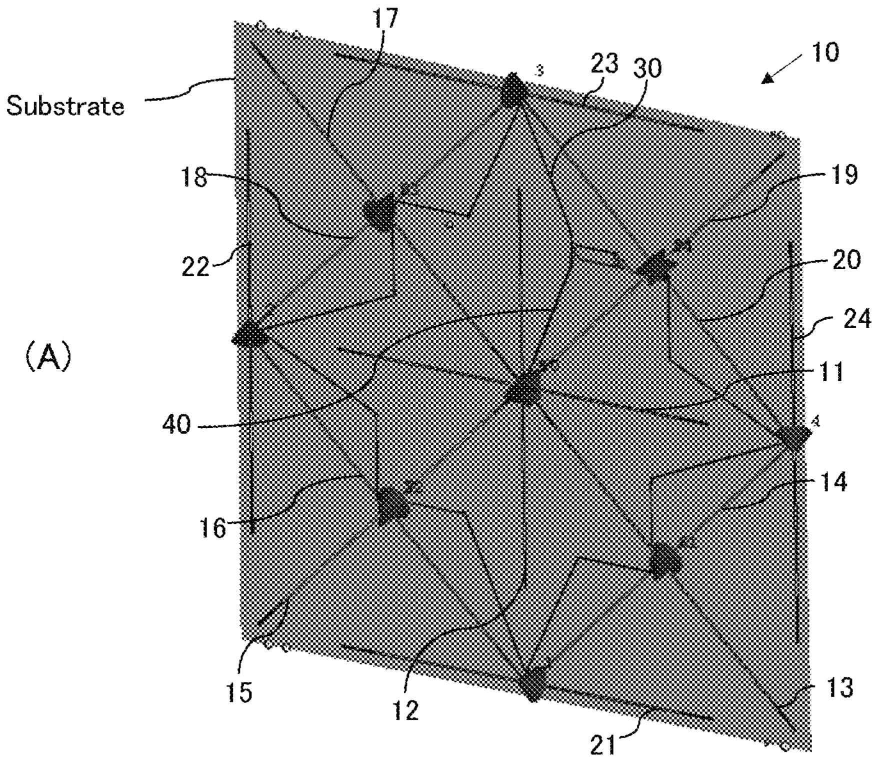
(B)
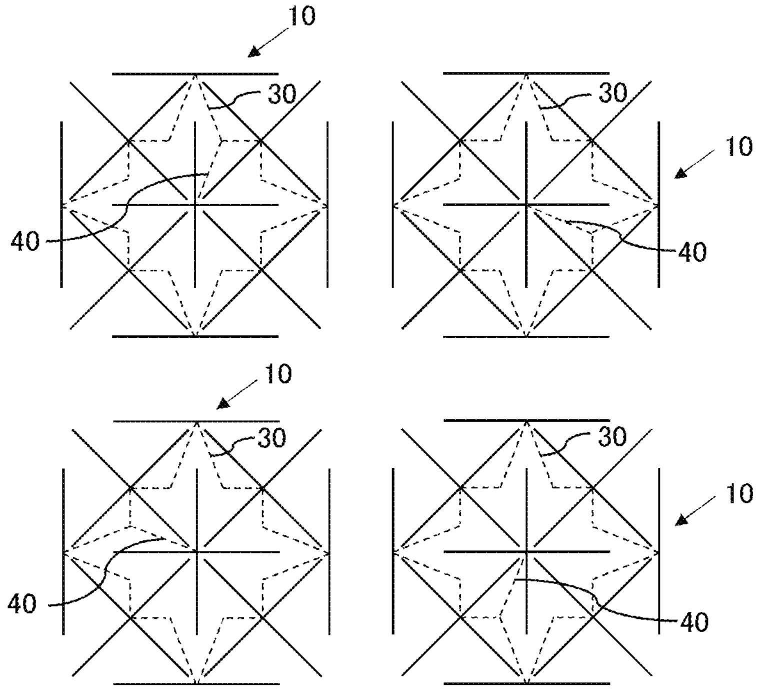

FIG. 3
(A)
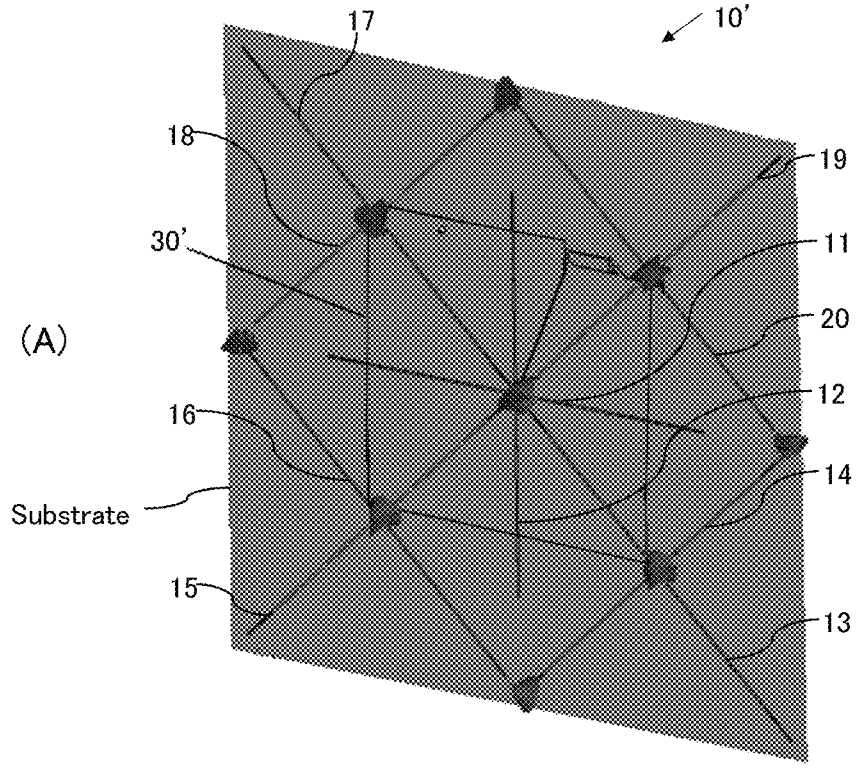
(B)
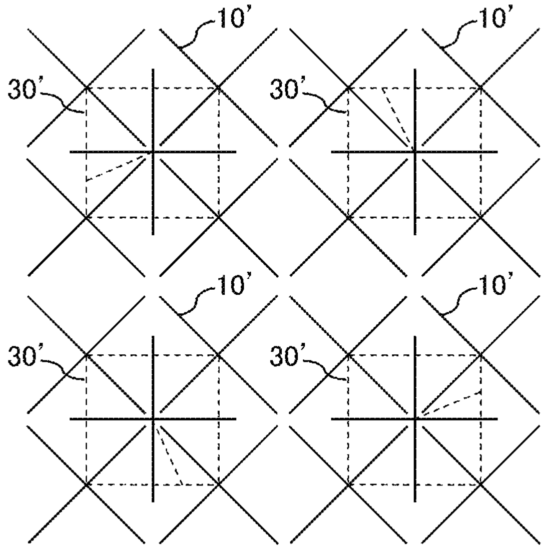

FIG. 4
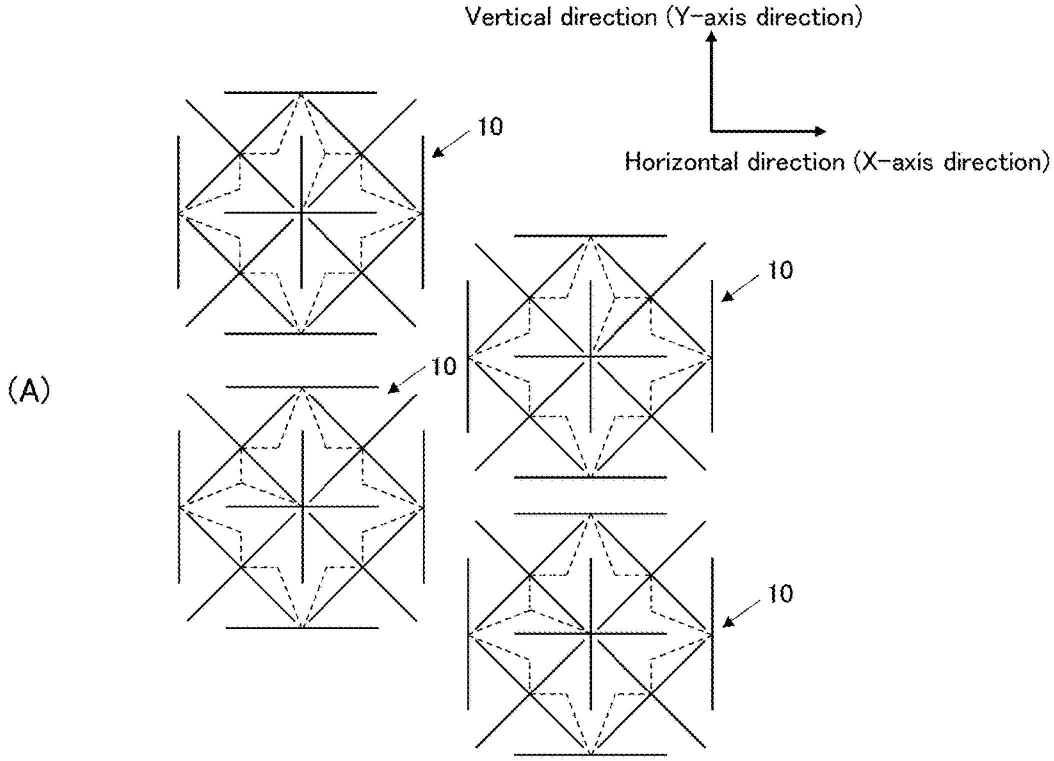
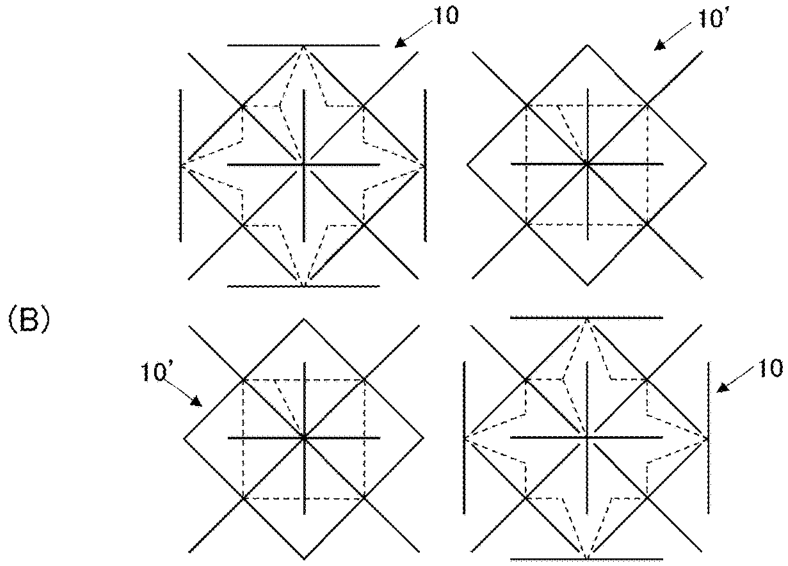

FIG. 7
(A)
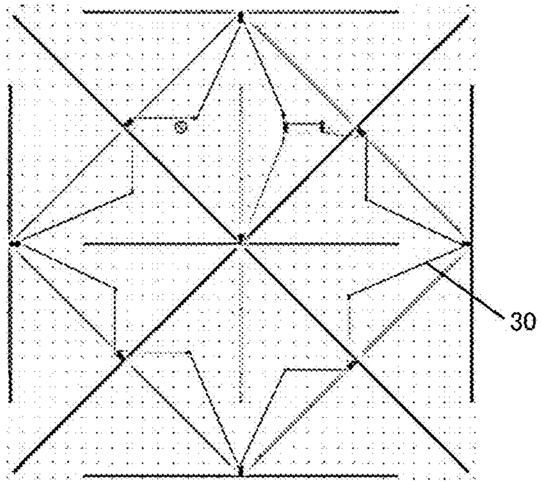
(B)
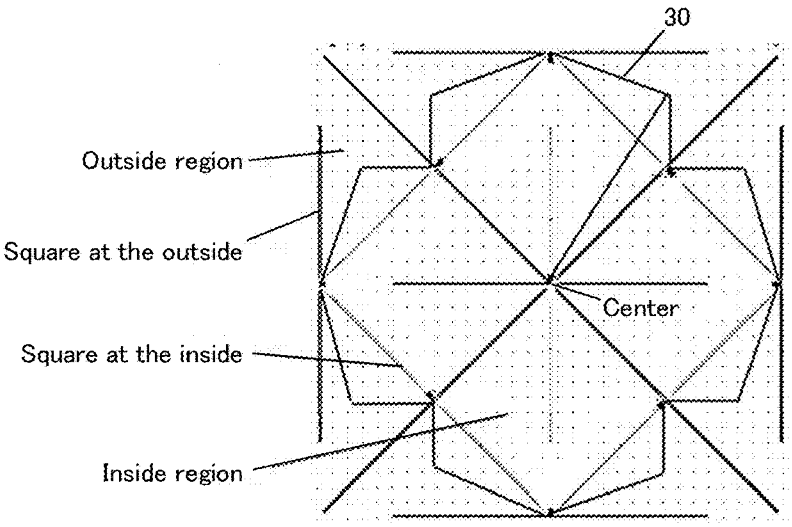
(C)
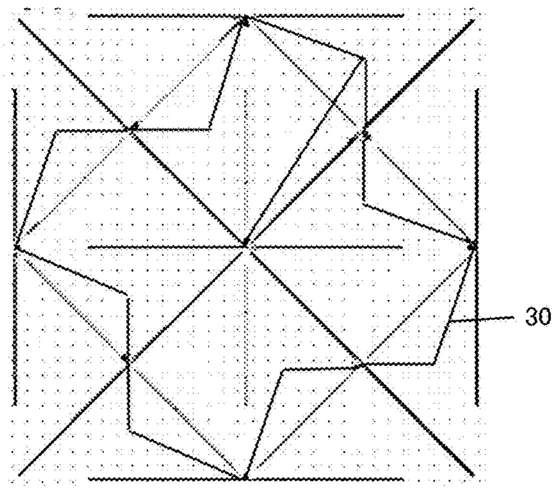

FIG. 20
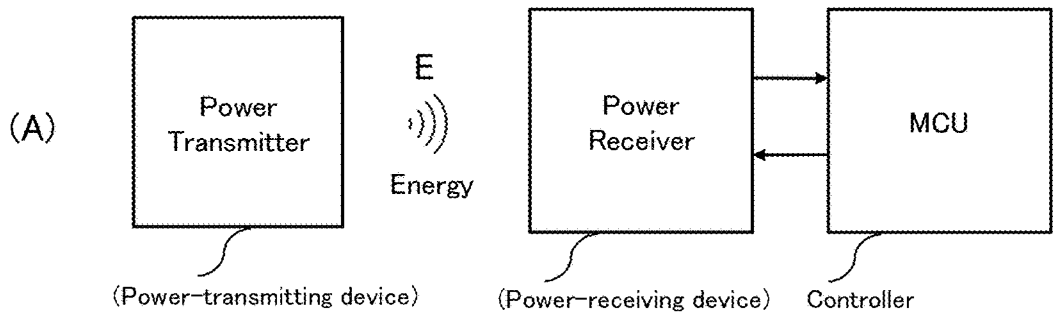
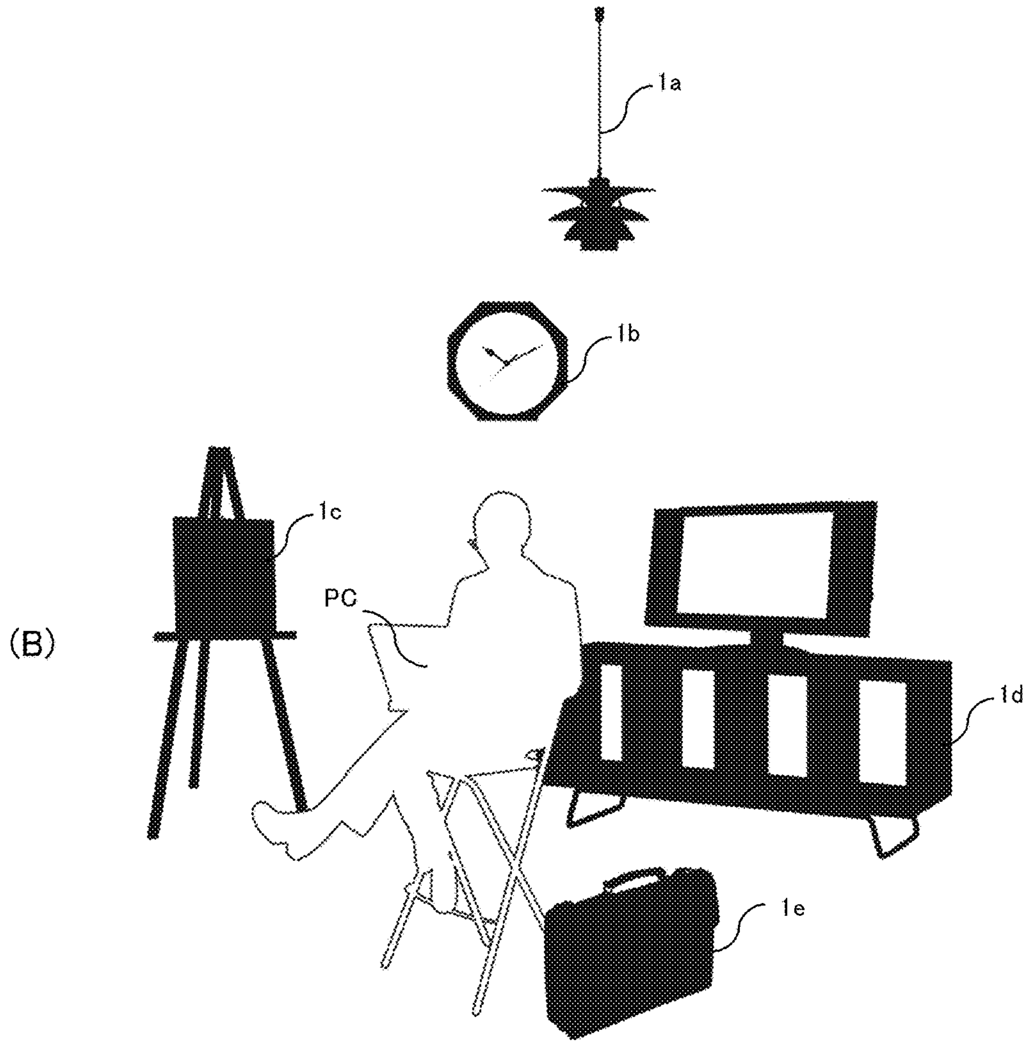

FIG. 21

| | FPC(Flexible Printed Circuits) | FFC(Flexible Flat Cable) |
|---|---|---|
| Appearance | 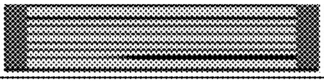 | 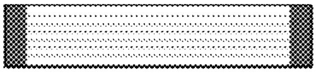 |
| Shape | Substrate (its shape can be freely formed as long as it can be developed into a sheet) | Cable (its shape is limited to flat shape) |
| Component mounting/ Pattern | Possible | Impossible |
| Shape changeable | Impossible (making the mold over is required) | Possible (only the length can be changed) |
| Cost | High (that depends on the implementation. The number of digits may be increased for the component cost, in addition to the mold cost) | Low |
| Lead time | Long | Short |

FIG. 22
(A)
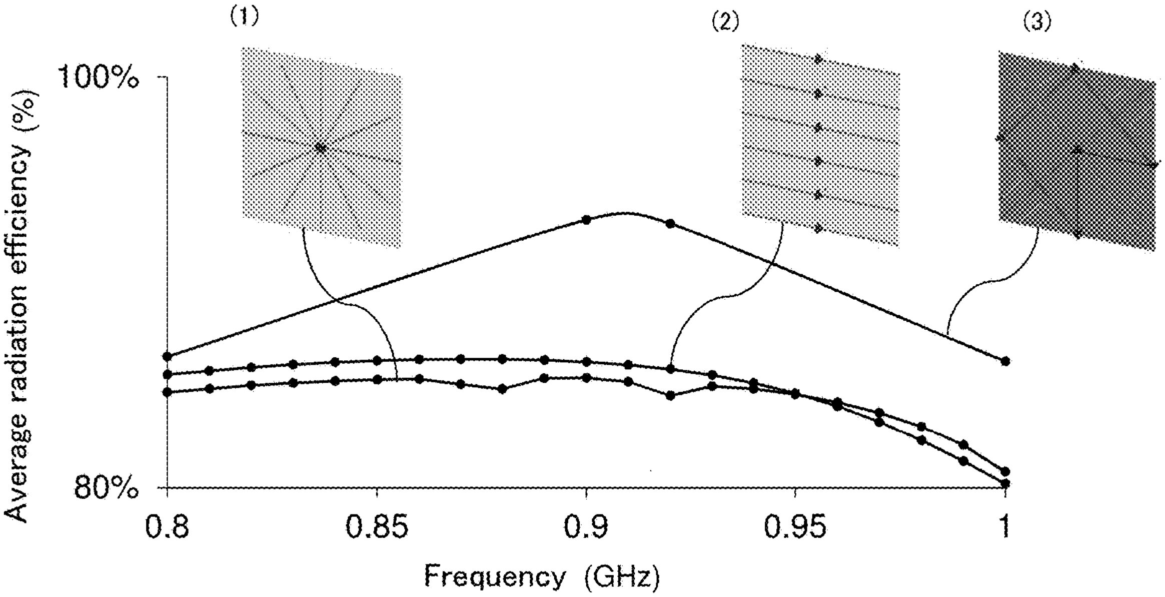
(B)
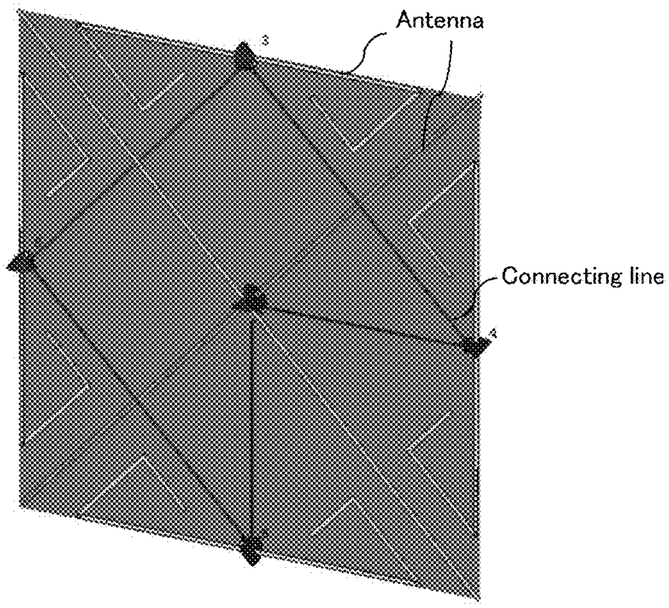

MULTI-ANTENNA ARRANGEMENT AND ITS CONNECTING METHOD

FIELD OF THE INVENTION

Relevant Applications

The present invention relates to a multi-antenna arrangement and its connecting method.

BACKGROUND

In recent years, a wireless power transfer (WPT: wireless power transfer) has been used in various fields. By using the WPT, it becomes possible to avoid the occurrence of problems such as the burden at formation of wiring, the breakage of wiring, the maintenance of wiring, etc., in comparison to a case where electric power is transferred by wiring.

In general, linear antennas such as dipole antennas have been used at a side of a power-receiving device of the WPT for receiving transmitted electric power. Usually, in a case where a single linear antenna is used, it is difficult to secure adequate quantity of electric power and directivity. Therefore, a plurality of linear antennas or a multi-antenna has been used.

In a case where a multi-antenna is used, performing the optimization of the number of the antennas, the distance between the antennas, the direction and connection of the antennas, and the like has been required. This is because, otherwise, electromagnetic coupling or the like may occur, and therefore the power receiving efficiency may be lowered. The optimum combination depends largely on the surrounding environment.

As a background art of the present technical field, JP-A-2010-41566 (Patent Document 1) may be cited. The Patent Document 1 discloses an example in which two dipole antennas are orthogonally crossed in a cross shape.

Also, as a background art of the present technical field, WO 2018/096740 (Patent Document 2) may be cited. The Patent Document 2 discloses an example in which two dipole antennas are orthogonally crossed in a cross shape. In addition, each end side of the cross shape is formed in an arrow-shape. Further, it is exemplified that the cross shapes are repeated in the vertical direction and in the horizontal direction.

PRIOR ART DOCUMENTS

[Patent Document 1] Japanese Unexamined Patent Application Publication No. 2010-41566

[Patent Document 2] PCT International Publication No. WO 2018/096740

SUMMARY OF THE INVENTION

Problem to be Solved by the Invention

In both of the Patent Documents 1 and 2, it is exemplified that two dipole antennas are crossed in a cross shape. However, in both documents, a multi-antenna for efficiently increasing the number of antennas was not thoroughly investigated. In view of the above, the present invention provides a multi-antenna which is capable of increasing the space efficiency and of avoiding or suppressing the problems of electromagnetic coupling.

Means for Solving the Problem

In order to solve the above-mentioned problems, for example, the configurations described in the claims can be adopted.

Although the present application includes a plurality of means for solving the above-mentioned problems, for example, according to an embodiment, a multi-antenna is provided. The multi-antenna is configured to include; a substrate; a total of two linear antennas provided in a substantially cross shape to define four regions on the substrate; a total of eight linear antennas that form a substantially cross shape in each of the four regions; a total of four linear antennas provided along four sides of a substantially square shape at outermost positions on the substrate to surround the four regions; and a connecting line provided to connect all of the fourteen linear antennas in a substantially loop shape in a clockwise or anti-clockwise direction.

The multi-antenna which is capable of increasing the space efficiency and of avoiding or suppressing the problems of electromagnetic coupling is thus provided.

BRIEF DESCRIPTION OF THE DRAWINGS

FIG. 1 is a diagram illustrating (A) a configuration example of a power-receiving device having a desk mat shape and (B) a cross-sectional view thereof, respectively (Example 1).

FIG. 2 is a diagram illustrating (A) a perspective view of a single multi-antenna, and (B) a plan view of a combination of a plurality of the multi-antennas, respectively (Example 1).

FIG. 3 is a diagram illustrating an example in which a part of FIG. 2 (A), (B) is modified (Example 1).

FIG. 4 is a diagram illustrating an example in which a part of FIG. 2 (B) is modified (Example 1).

FIG. 7 is a diagram illustrating an example in which a part of FIG. 6 (E) is modified (Example 1).

FIG. 20 is a diagram roughly illustrating examples (A) and (B) in which a power-receiving device is used in the building management area.

FIG. 21 is a diagram illustrating an example of a table in which substrates which are applicable to the multi-antenna of FIG. 2 (A) are shown in comparison.

FIG. 22 is a diagram illustrating a graph for showing radiation efficiencies of various multi-antennas of conventional technology, subdivided in (A) and (B).

DESCRIPTION OF THE PREFERRED EMBODIMENTS

Figure 5:
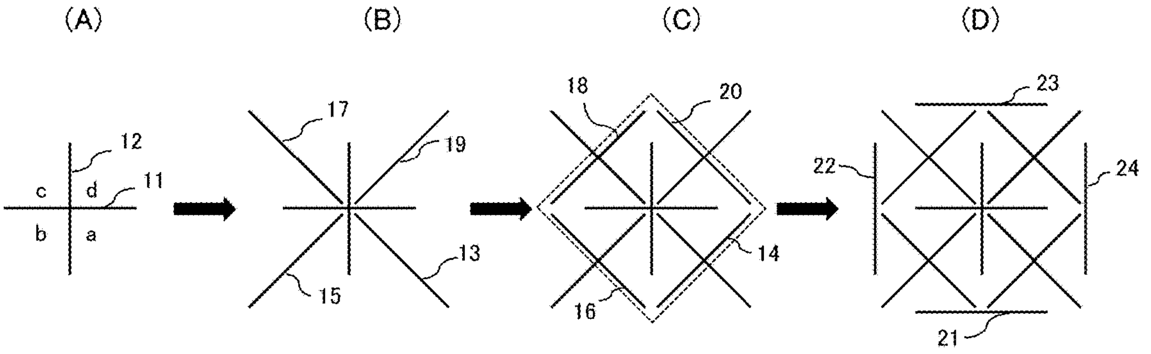
FIG. 5 is a diagram illustrating a way to configure a multi-antenna in stages (A) to (D) (Example 1).

Hereinafter, embodiments for carrying out the invention will be explained by referring to figures. Each one of the below-mentioned embodiments is given as an application example for providing the invention. The contents of the invention will not be limited by the descriptions of the below-mentioned application examples.

In recent years, a WPT (which is an abbreviation of Wireless Power Transmission or Wireless Power Transfer) has been used in various fields for transmitting energy to a PC, a sensor, an actuator, a robot, or an apparatus, etc.

For example, energy is transmitted between a power-transmitting device (or power transmitter) and a power-receiving device (or power receiver) by using microwaves, according to the WPT.

In general, one or a plurality of linear antennas such as dipole antennas are used in a power-receiving device to receive energy that is transmitted from a power-transmitting device.

In order to efficiently transmit and receive energy according to the WPT, various problems have to be considered. For example, it is necessary to take into consideration physical constraints because radio waves are attenuated during the power transmission in free space. In addition, it is necessary to take into consideration legal constraints because the upper limit of the electric power to be transmitted is regulated by 1 W.

On the other hand, such legal constraints are softened on the power-receiving device. However, at the side of the power-receiving device, there are specific problems as described below.

"Electrical Problems"

When energy is received with a single antenna, it may be difficult to obtain a sufficient amount of power to be received or a directivity to operate a sensor or the like.

On the other hand, when a multi-antenna is used, it is necessary to optimize the number of antennas, the distance between antennas, the orientation of antennas, and the connection of antennas, etc., because otherwise, the power receiving efficiency of the multi-antenna will be decreased.

"Physical Problems"

In order to arrange and maintain a multi-antenna in a power-receiving device, a housing may be used to optimize the arrangement. However, in a case where a flexible substrate is used as the material of the housing, physical problems may occur because the flexible substrate is vulnerable to a strong stress and heat. Therefore, it is necessary to ensure that the arrangement of the multi-antenna is not damaged due to a strong stress and heat.

"Environmental Problems"

In a case where a multi-antenna is exposed or protruding in the surrounding environment, there is a risk that the aesthetic appearance may be impaired. In general, there is a trade-off relation between an amount of power to be received by a multi-antenna (or, the optimum arrangement of a plurality of antennas so as to have a large area) and its aesthetic appearance (or, the fact that a person is not aware of the antenna). Therefore, it is preferable that a multi-antenna is provided to be in harmony with the surrounding environment so as not to be unnatural, "Manufacturing Problems"

In general, a manufacturing cost of a multi-antenna having a small component-mounting area and a large substrate area is likely to be increased. In addition, in a case where each linear antenna, etc., cannot be applied uniformly in a multi-antenna, the efficiency of mass production is likely to be impaired. Therefore, it is preferable to configure a multi-antenna so as to reduce burdens in terms of the manufacturing "Legal Problems"

As described above, upper limits may be set for the transmitting-power and the transmitting-antenna gain. However, such a strict restriction is not imposed on power-receiving devices. For example, an upper limit on the number of antennas for receiving energy may not be defined. Nevertheless, it is preferable to increase a power receiving efficiency between a power-transmitting device and a power-receiving device after understanding the problems on the power-transmitting device.

"Building Management Problems"

In a case where a power-receiving device is used in a building management area (or comprehensive management area related to the management of buildings such as office buildings or commercial facilities), the size of the power-receiving antenna is relatively unlikely to be restricted. However, a distance between a power-transmitting device and a power-receiving device is likely to be relatively long. Therefore, there is a demand for increasing the power receiving efficiency. In addition, it is further requested that the power-receiving antenna is provided to be in harmony with the surrounding environment.

The applicants have worked out multi-antennas which are capable of being used in a power-receiving device according to the WPT to obtain preferable performances, from the above-mentioned various aspects (Example 1).

In addition, the applicants have worked out an interface substrates which are capable of being used to assist in the arrangement and the connection of each linear antenna (Example 2).

In general, an antenna in which a plurality of elements are arranged can be referred to an "array-antenna". Typically, a plurality of elements having the same shape and the same size are arranged in the array-antenna. Desired characteristics such as the amount of power to be received and the directivity can be designed by means of the number of elements, the installation method of the elements, or the like.

In general, the array-antenna is configured to strongly radiate in a particular direction. The strength of radio waves to be received decreases almost in inverse proportion to the distance.

Also, in general, the array-antenna is configured so that the lengths of the elements are adjusted so as to send even and strong electric current in order to eliminate phase differences of electric current as much as possible.

For example, the element is configured as a linear antenna, for example, a dipole antenna which is composed by using a copper wire.

In general, a dipole antenna is able to be simplified to a single wire. The dipole antenna is a balanced circuit in which the lengths of the left side and the right side of the dipole antenna are made to be the same so that the amounts of electric current flowing through the left side and the right side can be uniformized.

In general, when the dipole antenna has the length of approximately half the wavelength, a resonance phenomenon is generated, and accordingly, the strongest current is allowed to flow therethrough.

In general, a dipole antenna is also referred to as a half-wavelength (½λ) dipole antenna, and its length d can be determined based on its operating frequency f (Hz) as below.

$$d = 3\times 10^8 / 2f(m)$$

However, a formula for finding d is not limited to the above-mentioned formula. For example, the length of the element may be kept within a range of from 96% to 97% of its size in order to eliminate the inductive reactance, as below:

$$d = (3\times 10^8 / 2f)\times(\text{any number in a range of from 0.96 to 0.97})(m)$$

As described above, a dipole antenna is designed as a resonant antenna that detects the electric field based on the wavelength of the operating frequency. However, when a dipole antenna is provided on a substrate of an electric circuit, there may be a case that the wavelength shortening rate is changed due to the thickness of dielectric layer of the substrate and the dielectric constant thereof. Furthermore, it is possible to modify the formula for finding the above-mentioned d, according to the method of arranging the dipole antenna, or the like.

Basically, the design concept of the array antenna is applicable in the multi-antenna according to the present example, but the method of arranging and connecting the elements is specially devised.

By applying the multi-antenna according to the present example, it becomes possible to obtain a sufficient amount of power to be received and a directivity for operating a sensor. At the time, it is also possible to avoid or minimize the occurrence of problems of electromagnetic coupling, or the like, by efficiently connecting the respective linear antennas and by designing the distance, the direction, the connection, or the like, between the respective linear antennas.

Especially, a plurality of basic shapes are arranged, and each of which has a cross shape having two linear antennas crossing each other. Therefore, it is devised to obtain a sufficient amount of power to be received and a directivity to enhance the radiation efficiency.

In addition, for a case where a multi-antenna is connected by a DC output connector or a DC connecting line (hereinafter, simply referred to as a "connecting line"), it is devised to arrange the connecting line along a bisector of an inner angle which is formed by neighboring two linear antennas to suppress the occurrence of adverse influences on the antennas.

In addition, for a case where the multi-antenna is connected by a DC connecting line, it is devised to change the direction of the connection at an inner center of a triangle formed by neighboring three linear antennas to suppress the occurrence of adverse influences on the antenna.

In addition, it is devised, by using an interface substrate, to efficiently carry out the arrangement and the connection of each of liner antennas and connecting lines which are constituting the multi-antenna.

Hereinafter, examples 1 and 2 will be described in that order. Before that, comparison tests which had been implemented by the applicants with regard to various multi-antennas of the prior art will be described.

"Comparison Tests of Various Multi Antennas"

There are various ways to configure a multi-antenna by using a plurality of linear antennas.

With referring to FIG. 22 (A), configurations of various multi-antennas and radiation efficiencies are exemplified from (1) to (3).

In each of the cases (1) to (3), a multi-antenna is configured by combining six linear antennas in a frame having a square shape whose side is 12 cm long.

In the case (1) of the figure, a multi-antenna is configured in which a plurality of linear antennas such as dipole antennas are arranged in a radial manner to intersect at the respective centers. In this example, a total of six antennas are arranged such that two adjacent antennas form an angle of 30 degrees. In this case, each antenna can be connected at the center so that the connection is facilitated.

In the case (2) of the figure, a multi-antenna is configured in which a plurality of linear antennas such as dipole antennas are arranged in a parallel manner with each other. In this example, a total of six antennas are arranged such that two adjacent antennas are separated at a predetermined distance. It is also possible to arrange the respective antennas to be connected with each other in a meandering manner or in a zigzag manner.

In the case (3) of the figure, a total of six antennas such as dipole antennas are arranged more complicatedly in comparison with the above-mentioned cases (1), (2). This example is devised by the applicants.

As can be seen in an expanded form in FIG. 22 (B), for the case of (3), two linear antennas are arranged in a substantially cross shape at a substantially center of the substrate. Furthermore, linear antennas are arranged along four sides of the quadrangle to surround the periphery. Both ends of each outer linear antenna are folded two times inward at angles of 45 degrees and 90 degrees, respectively. Each antenna can be connected relatively easily along a black colored connecting line.

With referring to FIG. 22 (A), the radiation efficiencies of the various multi-antennas of the above-mentioned cases (1), (2) and (3) are depicted in comparison.

When comparing them within a range of frequency from 0.8 GHz to 1.0 GHZ, considering a practical use zone, the multi-antenna of the case (3) has the highest radiation efficiency. For example, supposing that the ideal performance of the antenna is 100%, then it is confirmed that the radiation efficiency has a value exceeding 90%, for example, at the frequency of 0.92 GHz. On the other hand, in the above-mentioned cases (1), (2), supposing that the ideal performance of the antenna is 100%, then it is confirmed that both of the radiation efficiencies have a value approximately 85%, at the frequency of 0.92 GHz.

As described above, when a plurality of linear antennas are combined to form a multi-antenna, there are various ways to configure it.

When the multi-antenna is arranged as illustrated in FIG. 22 (B), it is confirmed that electric power can be received with relatively high efficiency. In this case, by further increasing the number of antennas, it may be possible to further increase the power receiving efficiency.

However, there is a problem in that the area of the substrate becomes larger as the number of the antennas becomes larger (that is the cost of the substrate becomes higher as the number of the antennas becomes larger). Accordingly, the manufacturing cost is likely to be high in the multi-antenna having a small component mounting area and a large substrate area.

In addition, when a large number of linear antennas are densely packed in a limited area, there is a risk that the interference or the like may be generated between the neighboring antennas, and the power receiving efficiency may be made worse.

Furthermore, the amount of power received by the multi-antenna (or, the optimum arrangement of a plurality of antennas in a large area) and the aesthetic appearance (or, the fact that a person is not aware of the antenna) are in the relationship of trade-off.

In the present example, improvements are made in the multi-antenna exemplified in the case (3) to further improve the performances in view of the results of the above-mentioned tests. Especially, a multi-antenna is provided in which a plurality of linear antennas are arranged close to each other so as to increase the space efficiency, and are respectively connected in a substantially loop shape (in other words, to be drawn with one stroke of a pen) so as to avoid or suppress the problems of electromagnetic coupling.

Example 1

"Configuration Example of Power-Receiving Device"

With referring to FIG. 1 (A), a power-receiving device 1 in which a multi-antenna according to the present example is accommodated is illustrated.

The term "multi-antenna" refers to an arrangement of a plurality of linear antennas (such as dipole antennas) which are disposed adjacent to each other to increase spatial efficiency.

Preferably, the respective antennas may be connected by a connecting line (for example, DC connecting line) so as to avoid or suppress the problems of electromagnetic coupling.

The term "power-receiving device" refers to a device which is capable of receiving energy transmitted from a separate power-transmitting device, in a three-dimensional space, using a multi-antenna included in the power-receiving device.

With referring to FIG. 1 (A), a power-receiving device 1 is configured in a sheet shape or a mat shape having an appropriate shape and an appropriate size to be put on a desk.

For example, the power-receiving device 1 is configured as a desk mat, a mouse pad, a table mat, a vinyl mat, a protective mat, or the like. The place where the power-receiving device 1 is set is, for example, an office desk, a table for eating meals, an upper surface of a shelf, or the like. The power-receiving device 1 is capable of receiving electric power transmitted from a power-transmitting device which is outside the desk, and of supplying the received electric power to, for example, an electronic device such as a personal computer, a mouse, a smartphone, a camera or the like which is disposed on the power-receiving device 1. The power supply from the power-transmitting device 1 to any one of these electronic devices may be performed wirelessly or by wire. By adopting such a configuration, it becomes possible to eliminate or reduce the need of wiring on the power-receiving device 1.

With referring to FIG. 1 (B), a cross section of the power-receiving device 1 of FIG. 1 (A) along a line A-A' is illustrated.

Preferably, the main body of the power-receiving device 1 is formed in multilayers including a front surface 2 and a back surface 3. For example, one surface of the two opposite surfaces 2, 3 (for example, the back surface 3) is made to be abutted on a top surface of the desk, and the other surface (for example, the front surface 2) is made to be a working surface on the desk.

Both of the front surface 2 and the back surface 3 of the power-receiving device 1 may be configured to be used as a working surface (that is, as a reversible type). The front surface 2 and the back surface 3 may each have the same color and the same material, etc. Alternatively, the front surface 2 and the back surface 3 may each have different colors and different materials, etc. For example, each of the front surface 2 and the back surface 3 may be formed using a resin or the like.

A FPC (or flexible substrate or flexible board) 4 is sandwiched between the front surface 2 and the back surface 3. It is possible to provide a printed circuit board (or substrate) on the FPC 4. Especially, a multi-antenna for receiving energy that is wirelessly transmitted in a three-dimensional space is provided on the FPC 4.

As a result, the multi-antenna is made to be invisible from the outside. Accordingly, it becomes possible to provide a multi-antenna without impairing the aesthetic appearance of the surrounding environment The FPC 4 may be made to be flexible. For example, the FPC 4 may be formed using a thin insulating material (such as plastic film). Therefore, the sheet-shaped power-receiving device 1 is capable of being rolled together with the built-in FPC 4.

A circuit 5 for enabling the multi-antenna built in the FPC 4 to function is accommodated between the front surface 2 and the back surface 3. It is possible to connect the FPC 4 and the circuit 5 by wire.

It is also possible to add an arbitrary device into the circuit 5 for improving a flow of balanced current flowing in the multi-antenna. For example, a filter, a mixer, or the like may be added thereto.

The power-receiving device 1 is capable of being connected to a controller or a MCU by wire, for transmitting data related to the power reception, to the MCU. For example, the power-receiving device 1 may feed back received power amounts to the MCU. The circuit 5 may have the functions of the MCU. Alternatively, the circuit 5 may be configured to be capable of performing the data communication with the MCU (not shown).

Since the details of the circuit 5 are outside the scope of the present embodiment, the detailed descriptions thereof will be omitted With referring to FIG. 2 (A), a perspective view of a multi-antenna 10 to be disposed on the substrate or FPC4 is illustrated.

With referring to FIG. 2 (B), a plan view of a plurality of multi-antennas 10 of FIG. 2 (A) is illustrated in which a plurality of multi-antennas 10 are vertically and/or horizontally juxtaposed.

It is possible to provide only one multi-antenna 10 in the FPC4 as illustrated in FIG. 2 (A).

Alternatively, it is also possible to provide a plurality of multi-antennas 10 in the FPC4 as illustrated in FIG. 2 (B).

As can be seen from FIG. 2 (A), the multi-antenna 10 is configured by using a plurality of linear antennas 11 to 24. The applicant has made special efforts to improve the method of arranging and connecting the linear antennas included in the multi-antenna 10 in order to optimize the power receiving efficiency with a limited installation area. Preferably, each linear antenna is a dipole antenna.

Preferably, the multi-antenna 10 is arranged on a substrate and is configured to include the following elements. That is, the multi-antenna 10 includes:

- a total of two linear antennas 11 and 12 which are provided in a substantially cross shape (for example, at a substantially center of the substrate) to define four regions on the substrate;
- a total of eight linear antennas 13 to 20 that form a substantially cross shape in each of the four regions;
- a total of four linear antennas 21 to 24 provided along four sides of a substantially square shape at outermost positions on the substrate to surround the four regions; and
- a connecting line(s) 30, 40 provided to connect all of the fourteen linear antennas 11 to 24 in a substantially loop shape in a clockwise or anti-clockwise direction.

The multi-antenna 10 illustrated in FIG. 2 (A) and a plurality of multi-antennas 10 illustrated in FIG. 2 (B) are preferred embodiments of the present example. However, please notice that the present example is not limited to these embodiments.

With referring to FIG. 3 (A), a perspective view of another example of a multi-antenna 10' which is disposed on the substrate or FPC 4 is illustrated.

With referring to FIG. 3 (B), a plan view of a plurality of multi-antennas 10' of FIG. 3 (A) is illustrated in which a plurality of multi-antennas 10' are vertically and/or horizontally juxtaposed.

This example corresponds to a configuration in which the total of four linear antennas 21 to 24 which are arranged along the outermost four sides of the quadrangle are omitted, as compared to the multi-antenna 10 illustrated in FIGS. 2 (A) and (B).

According to the multi-antenna 10' illustrated in FIGS. 3 (A) and (B), the number of linear antennas to be used is reduced, as compared to the multi-antenna 10 illustrated in FIGS. 2 (A) and (B). As a result, the power receiving efficiency is decreased, but the manufacturing cost is decreased, simultaneously.

Preferably, the multi-antenna 10' is arranged on a substrate and is configured to include the following elements. That is, the multi-antenna 10' includes:

- a total of two linear antennas 11 and 12 provided in a substantially cross shape (for example, at a substantially center of the substrate) to define four regions on the substrate;
- a total of eight linear antennas 13 to 20 that form a substantially cross shape in each of the four regions; and
- a connecting line(s) 30', 40' to connect all of the ten linear antennas 11 to 24 in a substantially loop shape in a clockwise direction or anti-clockwise direction.

In addition, it is also possible to include any one or a plurality of the total of four linear antennas 21 to 24 which are arranged along the four sides of the substantially quadrangle, at the outermost on the substrate to surround the four regions, as depicted in FIG. 2 (A).

With referring to FIG. 4 (A), a modification of the configuration of a plurality of multi-antennas 10 of FIG. 2 (B) is illustrated. As depicted in the figure, when a plurality of multi-antennas 10 are juxtaposed in the longitudinal direction (or Y-axis direction) and/or the lateral direction (or X-axis direction), it is possible to offset the neighboring multi-antennas 10 from one another. The size of the interval of the offset can be arbitrarily set.

With referring to FIG. 4 (B), a modification of the configuration of a plurality of multi-antennas 10 of FIG. 2 (B) is illustrated. As depicted in the figure, when a plurality of multi-antennas 10 are juxtaposed in the longitudinal direction (or Y-axis direction) and/or the lateral direction (or X-axis direction), it is possible to arrange the multi-antenna 10 illustrated in FIG. 2 (A) in combination with the multi-antenna 10' illustrated in FIG. 3 (A). The order of the arrangement can be arbitrarily set.

Optionally, it is possible to offset the neighboring multi-antennas 10 of FIG. 4 (B) from one another, as illustrated in FIG. 4 (A).

Optionally, it is possible to turn any one of a plurality of the multi-antennas 10 of FIG. 4 (A) in a clockwise direction or anti-clockwise direction.

Optionally, when a plurality of the multi-antennas 10 of FIG. 2 (B) are juxtaposed, it is possible to juxtapose the outermost antenna 21 to 24 to be shared with the other neighboring multi-antenna(s) 10.

The explanation below focuses mainly on the multi-antenna 10 illustrated in FIG. 2 (A) to avoid the overlapped descriptions. However, please notice that the contents of the descriptions can be applied to the multi-antenna 10' illustrated in FIG. 3 (A).

"Configuration Example of Multi Antenna"

Subsequently, with referring to FIG. 5, the method of arranging the respective antennas 11 to 24 of the multi-antenna 10 of FIG. 3 (A) will be described in detail.

With referring to FIG. 5 (A), a total of two linear antennas (hereinafter simply referred to as antennas), such as two dipole antennas 11, 12 are arranged in a substantially cross shape at a substantially center of the substrate to divide the substrate into four regions a to d. Preferably, the respective antennas 11, 12 are orthogonal to each other at an angle of 90 degrees. This arrangement allows to suppress the occurrence of electromagnetic coupling due to the mutually interfering antennas 11, 12, to a minimum. Preferably, the two antennas 11, 12 have substantially equal lengths and cross each other at the center thereof.

With referring to FIG. 5 (B), it is illustrated that a total of four antennas 13, 15, 17, and 19 are radially arranged around the intersection point of the two antennas 11 and 12. These four antennas 13, 15, 17 and 19 are arranged at an angle of approximately 45 degrees with respect to the above-mentioned two intersecting antennas 11, 12, respectively.

Each one of the antennas 13, 15, 17 and 19 is arranged at a substantially equal distance from the antenna 11, 12, in each of the four regions a to d which are defined by the antenna 11, 12. Accordingly, this arrangement allows to suppress the occurrence of electromagnetic coupling due to the mutually interfering antennas 11, 12, 13, 15, 17, and 19 to a minimum.

In this example, the neighboring antennas which are brought closest to each other are arranged at an angle of 45 degrees to each other. For example, the angle formed by the two lines of antennas 11, 13 is made to be 45 degrees. Preferably, each one of the antennas 13, 15, 17, and 19 has the same length, and one end of each antenna is directed to the above-mentioned intersection point, and the other end is directed to be farther away from the intersection point.

With referring to FIG. 5 (C), further antennas 14, 16, 18, and 20 are arranged to cross to the four antennas 13, 15, 17, and 19 which are disposed in the radial manner, respectively. The respective two antennas which are arranged in a substantially cross shape are mutually orthogonal to each other at an angle of 90 degrees. Accordingly, this arrangement allows to suppress the occurrence of electromagnetic coupling due to the mutually interfering antennas to a minimum.

Preferably, the two crossing antennas in each of the four regions a to d have substantially the same length and cross each other at their centers. For example, the antenna 13 and the antenna 14 have substantially the same length and cross each other at their centers. The added antennas 14, 16, 18, and 20 are arranged along four sides of a substantially square shape, as indicated by a dotted line, as a whole.

Each one of the antennas 13, 15, 17 and 19 is arranged at substantially equal distance from the antennas 11, 12, in each of the four regions a to d which are defined by the antennas 11, 12. Accordingly, this arrangement allows to suppress the occurrence of electromagnetic coupling due to the mutually interfering antennas 11, 12, 13, 15, 17, and 19 to a minimum.

In this way, in each of the four regions a to d which are defined by the intersecting antennas 11, 12 (see FIG. 5 (A)), further antennas are arranged in a substantially cross shape (see FIG. 5 (C)). Accordingly, a total of eight linear antennas 13 to 20 are added.

Each one of the substantially cross shapes (formed by the linear antennas 13 to 20) located in the four regions a to d has substantially the same inclination angle with respect to the substrate (see FIG. 5 (C)). In this case, as will be described later, it is easy to geometrically arrange a connecting line 30 for connecting the respective antennas 13 to 24 in a symmetrical manner, in the vertical direction and/or in the horizontal direction.

Subsequently, with referring to FIG. 5 (D), further antennas 21, 22, 23, and 24 are arranged to surround the circumference of the above-mentioned ten antennas 11, 12, 13, 14, 15, 16, 17, 18, 19, and 20 from the outside. The antennas 21, 22, 23, and 24 are arranged such that adjacent antennas are disposed to form an almost right angle with each other. Accordingly, the antennas 21, 22, 23, and 24 are arranged on four sides of a square shape, as a whole.

The antennas 21, 22, 23, and 24 may be provided to extend straight along the four sides of the square shape. Alternatively, as will be described below with referring to FIG. 12, these antennas may be bent at an angle of 90 degrees at the center where a rectifier is disposed, to extend along the four corners of the square shape.

In the end, a total of fourteen linear antennas 11 to 24 are arranged, as a whole, inside the four sides of the square shape which is formed by the antennas 21, 22, 23 and 24. Therefore, a plurality of antennas 11 to 24 are densely arranged in a limited space, thereby increasing the space efficiency. At the time, by variously changing the directions of the fourteen antennas 11 to 24, it becomes possible to diversify the radiation efficiency, as a whole. In addition, the neighboring two antennas are disposed so as to make an angle of 90 degrees or 45 degrees between them so that it becomes possible to reduce an interference between the neighboring two antennas, to a minimum.

Please notice that the multi-antenna 10 consisting of a total of fourteen linear antennas 11 to 24 depicted in FIG. 5 (A) to (D) corresponds to the embodiment depicted in FIG. 2 (A).

Also, the multi-antenna 10' consisting of a total of ten linear antennas 11 to 20 depicted in FIG. 5 (A) to (C) corresponds to the embodiment depicted in FIG. 3 (A).

In addition, it is also possible to add one or a plurality of the outermost antennas 21 to 24 into the above-mentioned multi-antenna 10'.

Subsequently, the method of connecting a total of fourteen antennas 11 to 24 (see FIG. 2 (A) and FIG. 5 (D)) will be described with referring to FIG. 6 (A) to (F).

Preferably, a connecting line 30 for connecting the respective antennas is a DC connecting line for connecting dipole antennas. Preferably, each antenna has an equal length on the left side and the right side so as to constitute a balance circuit. A rectifier is provided at the center of the antenna. Each antenna is connected to the rectifier, and the rectifier is connected by the connecting line 30. At the time, the polarities of the rectifiers shall be aligned to be connected.

Please notice that the kind of the rectifier applied in the present embodiment is arbitrary.

In general, the connecting line for connecting the respective antennas is arranged so as not to have a complicated configuration.

For example, in the multi-antenna 10' illustrated in FIG. 3 (A), the connecting line 30' for connecting the respective antennas in a substantially loop shape is formed by a comparatively simple structure.

For example, in FIG. 3 (A), the connecting line 30' is formed based on the four sides of a substantially quadrangle, Also, in the multi-antenna illustrated in FIG. 22 (B), the connecting line for connecting the respective antennas in a substantially loop shape is formed by a comparatively simple structure, based on the four sides of a substantially quadrangle.

On the other hand, in the multi-antenna 10 illustrated in FIG. 2 (A), the connecting line for connecting the respective antennas in a substantially loop shape is made more complicated because the number of the antennas is increased.

The present applicants devised to configure the connecting line 30 not to have a complicated configuration even in such a case.

In particular, the connecting line 30 is positioned along a bisector of an inner angle (or internal angle) formed by neighboring two linear antennas (in other words, it is positioned along a line that divides an inner angle into two equal parts) when the connecting line 30 is placed to pass through between neighboring two antennas.

In addition, the connecting line 30 is positioned to pass through an inner center of a triangle formed by three antennas around it.

Accordingly, the connecting line 30 for connecting the respective antennas 13 to 24 is regularly provided so that it becomes possible to geometrically arrange the finally obtained connecting line 30 in a symmetrical manner in the vertical direction and/or in the horizontal direction, as a whole, while obtaining desired characteristics of the antennas.

Figure 6:
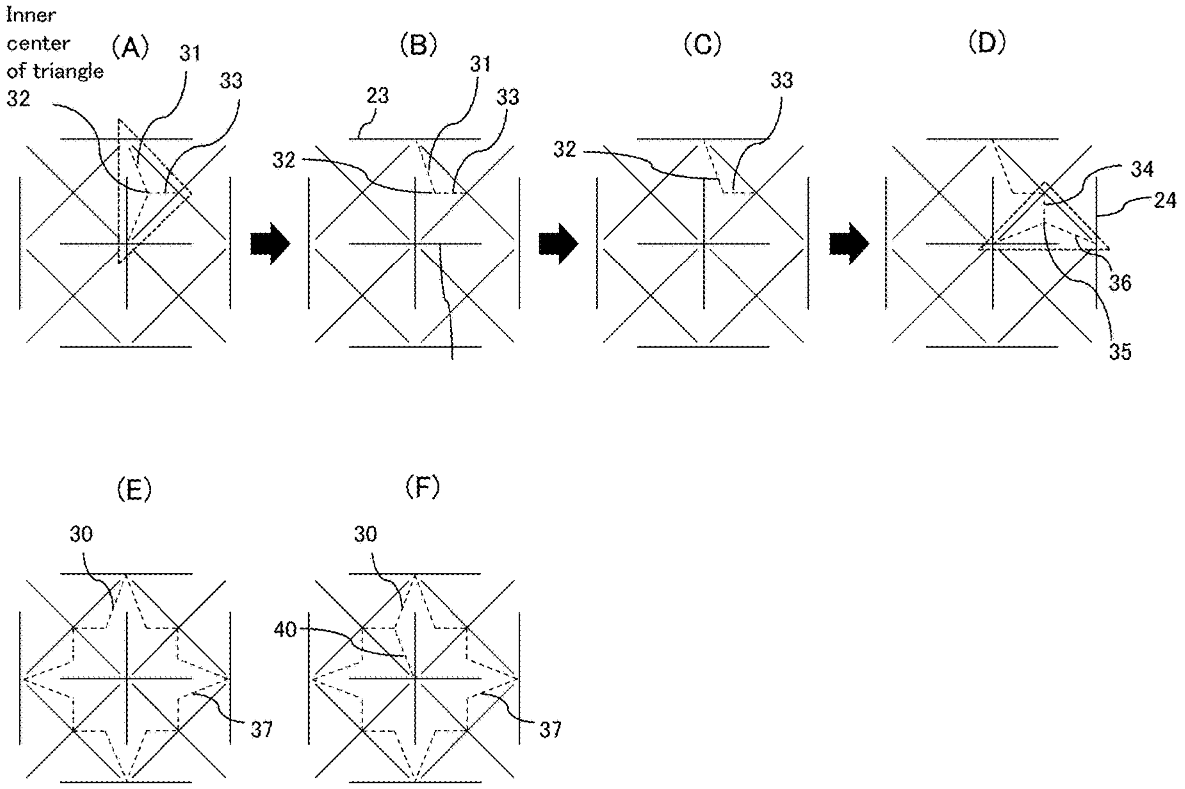
FIG. 6 is a diagram illustrating a way to configure a multi-antenna in stages (A) to (F) (Example 1).

With referring to FIG. 6 (A), it is illustrated that a triangle is formed by three antennas 12, 19, and 20 which are arranged close to each other (see dotted triangle). At the time, the respective antennas 12, 13, and 14 do not necessarily have to intersect each other. It is assumed that a triangle is formed by straight lines virtually extending along the respective antennas 12, 19, and 20.

Neighboring two antennas can correspond to two sides of the triangle, and an inner angle can be defined between them. In each one of three inner corners of the triangle, a bisector of the inner corner can be uniquely defined. For example, a bisector 31 can be uniquely defined at the inner angle defined by the antennas 12 and 20.

In FIG. 6 (A), it is illustrated that, for each of three inner angles of the triangle formed by three antennas 12, 19 and 20, a bisector is drawn in a dotted line. These three bisectors always intersect at one point, as generally known. This intersection point is called an inner center 32.

The position of the inner center 32 is equidistant from each of the three antennas 12, 19 and 20. Therefore, by connecting the adjacent antennas using the inner center 32, it becomes possible to suppress an interference between the adjacent antennas.

With referring to FIG. 6 (B), it is illustrated that two antennas 23 and 20 which are not orthogonal to each other are connected by a wiring passing through the inner center of the triangle (or intersecting point of the bisectors of the angles) formed by the antennas 12, 19 and 20 as illustrated in FIG. 6 (A).

It is exemplified that the connecting line 30 corresponding to the bisector of the inner angle formed by the two antennas 12 and 20 (which correspond to two sides of the triangle) passes through the inner center of the triangle. The connecting line 31 is capable of connecting the antennas 23 and 20 at an end opposite from the inner center 32. In other words, the connecting line 31 can connect the antenna 23 which is arranged along one side of the outermost square shape with the antenna 20 which is arranged along one side of the square shape on its inside. At the time, the outermost antenna 23 and the antenna 20 disposed in the inside thereof are arranged at an angle of 45 degrees with each other.

The connecting line 31 is located at equal distances from the two adjacent antennas 12, 20, respectively, so that it becomes possible to minimize an interference between the two antenna.

With referring to FIG. 6 (C), it is illustrated that the connecting line 33 corresponding to a bisector of an inner angle formed by the antennas 19 and 20 (which correspond to the two sides of the triangle) passes through the inner center 32 of the triangle. The connecting line 33 is capable of connecting the antennas 19 and 20 at an end opposite from the inner center 32. These antennas 19 and 20 are mutually arranged perpendicularly at an angle of 90 degrees.

The connecting line 33 is located at equal distance from the two adjacent antennas 19 and 20, respectively so that it becomes possible to minimize an interference between the antennas.

Therefore, the connecting line 31 corresponding to the bisector of the inner angle formed by two sides of the triangle connects the antennas 20 and 23 at one end side, and reaches at the inner center 32 at the opposite end side where the direction of the connecting line 31 is changed to be connected with the connecting line 33 which is corresponding to the bisector of the inner angle formed by two sides of the triangle in like manner. The antennas 19 and 20 are connected by the connecting line 33 at one end side thereof.

It can be understood that the connecting lines 31 and 33 are continuous as a single line which is bent at the inner center 32.

With referring to FIG. 6 (D), it is illustrated that a triangle is formed by three antennas 11, 19, and 20 in the same way of the case of FIG. 6 (A). Also in this case, the three bisectors of three inner angles of the triangle formed by the three antennas 11, 19, and 20 meet at a single point which is corresponding to an inner center 35.

That is, the connecting line 34 corresponding to the bisector of the inner angle formed by the antennas 19 and 20, and the connecting line 36 corresponding to the bisector of the inner angle formed by the antennas 11 and 20 meet at the inner center 35 of the triangle formed by the antennas 11, 19, and 20.

The connecting line 34 is connected to the connecting line 33 at one end side. At that point, the two antennas 19 and 20 which are orthogonal at an angle of 90 degrees are connected.

The connecting line 34 is located at equal distances from the two adjacent antennas 19, 20, respectively, so that it becomes possible to minimize the occurrence of interference between these antennas.

The connecting line 34 reaches at the inner center 35 where the direction of the connecting line 34 is changed to be connected with the connecting line 36. The connecting line 36 connects the two antennas 20, 24 which are arranged at an angle of 45 degrees with each other, on the opposite side of the connecting line 36.

The connecting lines 36 is located at equal distances from the two adjacent antennas 11, 20, respectively, thus it becomes possible to minimize the occurrence of interference between these antennas.

In this way, the four regions a to d are defined by the two intersecting antennae 11, 12. As illustrated in FIG. 6 (A) to (D), two inner centers of triangles are defined in each of the four regions a to d.

The connecting line 31, the connecting line 33, the connecting line 34, and the connecting line 36 which pass through the inner centers 32, 35 are continuous as a single line which is bent at the inner center 32, 35 in a way to go in a zigzag pattern.

Hereinafter, as shown by reference numeral 37 in FIG. 6 (E), it can be seen that the connecting line is continuously drawn in the same manner.

With referring to FIG. 6 (E), it is illustrated that the single connecting line 30 is finally obtained by repeating the respective steps illustrated in FIG. 6 (A) to (D).

The connecting line 31, the connecting line 33, the connecting line 34, and the connecting line 36, the connecting line 37, etc., are continuous as a single line which is made to be bent at the inner center 32 and the inner center 35, etc. Finally, it returns to its original position after traveling round the four regions a to d, in a clockwise or anti-clockwise direction. As a result, the finally obtained connecting line 30 is capable of being formed into a ring shape or a star shape which is regularly bent or curved.

Therefore, a total of twelve antennas 13 to 24 including the four antennas 13, 15, 17, and 19 which are disposed in a radial manner, inclined at an angle of 45 degrees with respect to the center of the substrate; the four antennas 14, 16, 18, and 20 which are disposed to be orthogonal to the above-mentioned four antennas at an angle of 90 degrees, respectively; and the four antennas 21, 22, 23, and 24 which are disposed along four sides of square shape at the outermost side, are respectively connected in a substantially loop shape.

As a result, the connecting line 30 connecting the respective antennas 13 to 24 is arranged symmetrically, in a geometric manner, in the vertical direction and/or in the horizontal direction.

With referring to FIG. 6 (F), it is illustrated that a connecting line 40 is finally added so as to correspond to a bisector of an inner angle of the two antennas 12 and 17 which are arranged at an angle of 45 degrees to each other. The connecting line 40 is provided to connect the connecting line 30 which goes around to form a ring with the two antennas 11 and 12 which are orthogonal to each other at an angle of 90 degrees. As a result, finally, all the fourteen antennas 11 to 24 are connected in a substantially loop shape.

As described above, by connecting all the fourteen antennas 11 to 24 in a substantially loop shape, it becomes possible to suppress the lengths of the connecting lines 30, 40 from becoming excessively larger, and to suppress the occurrence of the problems such as electromagnetic coupling, as a whole.

The finally added connecting line 40 is not limited to the embodiment illustrated in FIG. 6 (F). For example, the connecting line 40 may be a bisector of an arbitrary inner angle formed by two lines which are brought closest to each other, and the inner angle can be formed by any one of the antennas 11 and 12, and any one of the antennas 13, 15, 17, and 19.

The connecting line 40 is not limited to the embodiment which is finally provided, but it is also possible to initially provide the connecting line 40.

Please notice that the connecting line 30 formed in a zig-zag shape at the inner center 32 and the inner center 35, etc., do not necessarily have to be perfectly arranged at the positions of these inner centers, in reality. For example, the position of the connecting line 30 may be partially shifted from the positions of the inner centers 32, 35, etc., in the horizontal direction (X-axis direction) and/or in the vertical direction (Y-axis direction), within the scope of ±10%, due to the relationship with other neighboring elements.

Here, the term of "scope of ±10%" refers to a range of 10% of a distance (which corresponds to a radius of an inscribed circle) measured from an inner center to one side of a triangle, with regard to the inscribed circle which is centered on the inner center. For example, the direction of increase of the distance may be made to be positive, and the direction of decrease of the distance may be made to be negative. Similarly, an "almost inner center" can refer to a position which is within a range of 10% of a radius of an inscribed circle which is centered at the perfect inner center. In this way, the almost inner center may be deviated from the perfect inner center due to the error range or certain reasons on its design.

As exemplified in FIG. 2 (B), in a case where four multi-antennas 10 are arranged (or arrayed) in series in the horizontal direction (X-axis direction) and/or in the vertical direction (Y-axis direction), the neighboring outermost antennas 21 to 24 of the juxtaposed four multi-antennas may be separated in the horizontal direction and the vertical direction.

Figure 14:
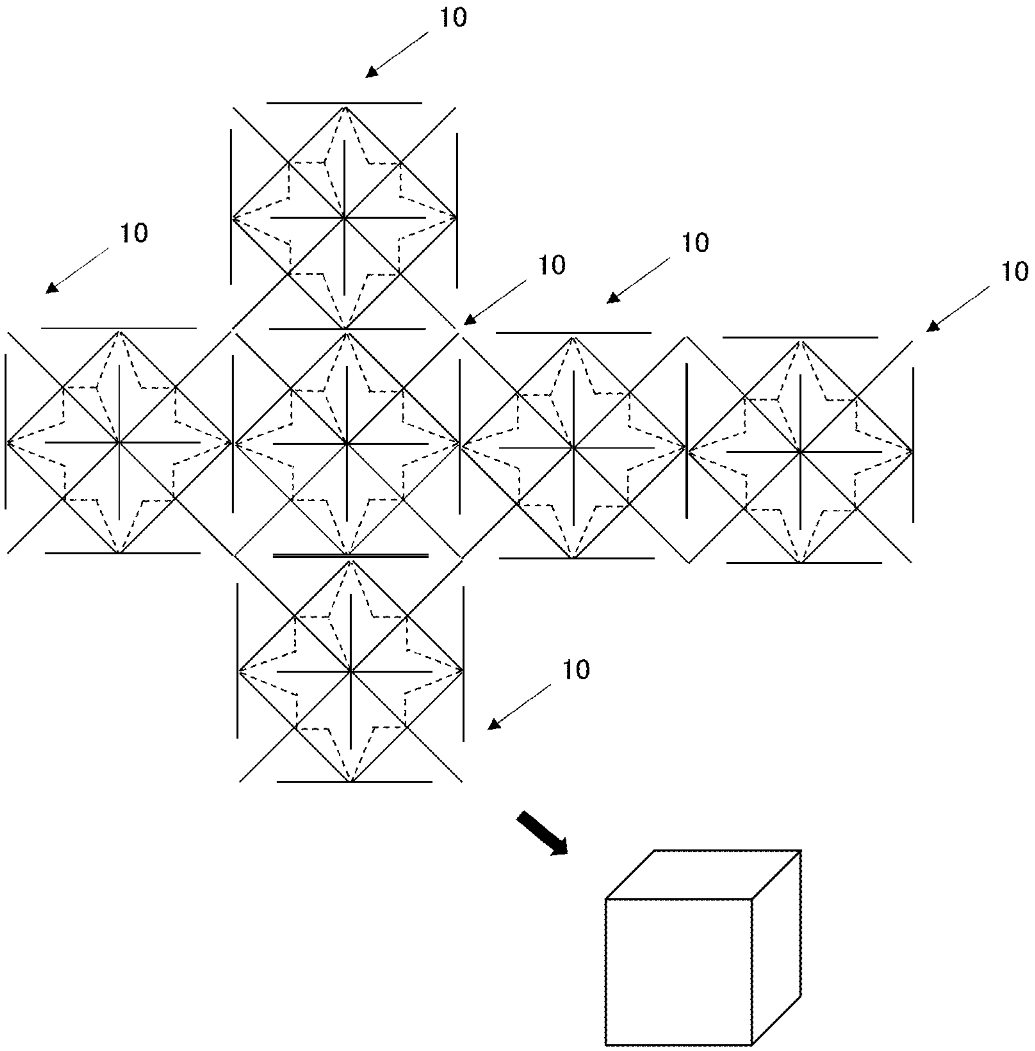
FIG. 14 is a diagram illustrating an example in which multi-antennas are provided on each surface of a hexahedron (Example 1).

Alternatively, the juxtaposed four multi-antennas 10 may be provided to share the neighboring outermost antennas 21 to 24 in the horizontal direction and the vertical direction (see FIG. 14).

Alternatively, as illustrated in FIG. 4 (B), the four multi-antennas 10 and 10' may be made to be continuous in the horizontal direction (X-axis direction) and/or the vertical direction (Y-axis direction), in effect, in order to share the neighboring outermost antennas 21 to 24 in the horizontal direction and the vertical direction.

In this way, it is possible to repeat at least two of a plurality of multi-antennas 10 and/or 10' in the horizontal direction and/or the vertical direction. At the time, it is possible to rotate a part of the multi-antennas 10 and/or 10'.

The multi-antennas 10 and/or 10' may be connected in parallel (in a serial type) into one, after being serially connected to one another. It is also possible to serially connect all of the multi-antennas 10 and/or 10' in accordance with the embodiment.

With referring to FIGS. 7 (A), (B), and (C), different embodiments of the connecting lines 30, 40 are illustrated with regard to the multi-antenna of FIG. 6 (F).

The embodiments of the connecting lines 30, 40 illustrated in FIG. 7 (A) correspond to the case illustrated in FIG. 6 (F).

In this example, a total of two antennas 11, 12 intersecting with each other at an angle of 90 degrees at their centers; a total of four antennas 13, 15, 17, and 19 radially arranged inclined at an angle of 45 degrees with respect to the intersection point of the two antennas 11 and 12; a total of four antennas 14, 16, 18, and 20 intersecting with respect to the above-mentioned four antennas 13, 15, 17, and 19 at an angle of 90 degrees, respectively; and a total of four antennas 21, 22, 23, and 24 which are arranged at four sides of a square shape at the outermost side, are connected by the connecting lines 30 and 40 in a substantially loop shape.

FIG. 7 (A) illustrates a more specific embodiment of the connecting line 30. In the aforementioned explanation with respect to FIG. 6 (F), etc., the connecting line 30 is configured to have a completely symmetrical shape in vertically and horizontally. However, please notice that a part of the connecting line 30 may be formed to be asymmetric.

In FIG. 6, the present technical idea about the connecting line 30 is conceptually illustrated. That is, each one of the antennas 11 to 24 and the connecting lines 30 and 40 may not be necessarily a perfect straight line in practice. For example, a part of them may be placed with a prescribed distance (shifted from the ideal position).

In this way, by using a total of fourteen antennas 11 to 24, a square shape at the outermost side, and a smaller square shape arranged inclinedly at an angle of 45 degrees with respect to the inside of the outermost square shape are formed, and the connecting line 30 is arranged in an area inside the smaller square shape.

However, please notice that the present embodiment is not limited to this case.

With referring to FIG. 7 (B), the connecting line 30 is disposed in an area inside the four sides of the outermost square shape formed by the four antennas 21, 22, 23, and 24, and in an area outside the four sides of the smaller square shape formed by the four antennas 14, 16, 18, and 20 which is inclined at an angle of 45 degrees.

Even in this case, the connecting line 30 is also arranged along bisectors at the respective inner angles formed by two neighboring antennas. Accordingly, it is possible to suppress an interference between the adjacent antennas to a minimum, by the connecting line 30.

With referring to FIG. 7 (C), the connecting line 30 for connecting the respective antennas is disposed in an area inside the outermost square shape formed by the four antennas 21, 22, 23, and 24 to pass alternately through an area outside and an area inside the smaller square shape formed by four antennas 14, 16, 18, and 20 which is inclined at an angle of 45 degrees.

In this case, the connecting line 30 (as exemplified in a dotted line in the figure) for connecting the respective antennas is connected to the structural center of the present antenna, in the order of the inside area, the outside area, the inside area, and the outside area, etc.

It is considered that by connecting the connecting lines 30, 40 for connecting the respective antennas in the above-mentioned order with respect to the center of the antenna structure, it becomes possible to design an antenna in which an interference between the connections of the antennas is less likely to occur.

Subsequently, with referring to FIG. 8 (A), (B), the electric current distributions and the radiation efficiencies of the multi-antenna 10 illustrated in FIG. 2 (A) will be described.

Figure 8:
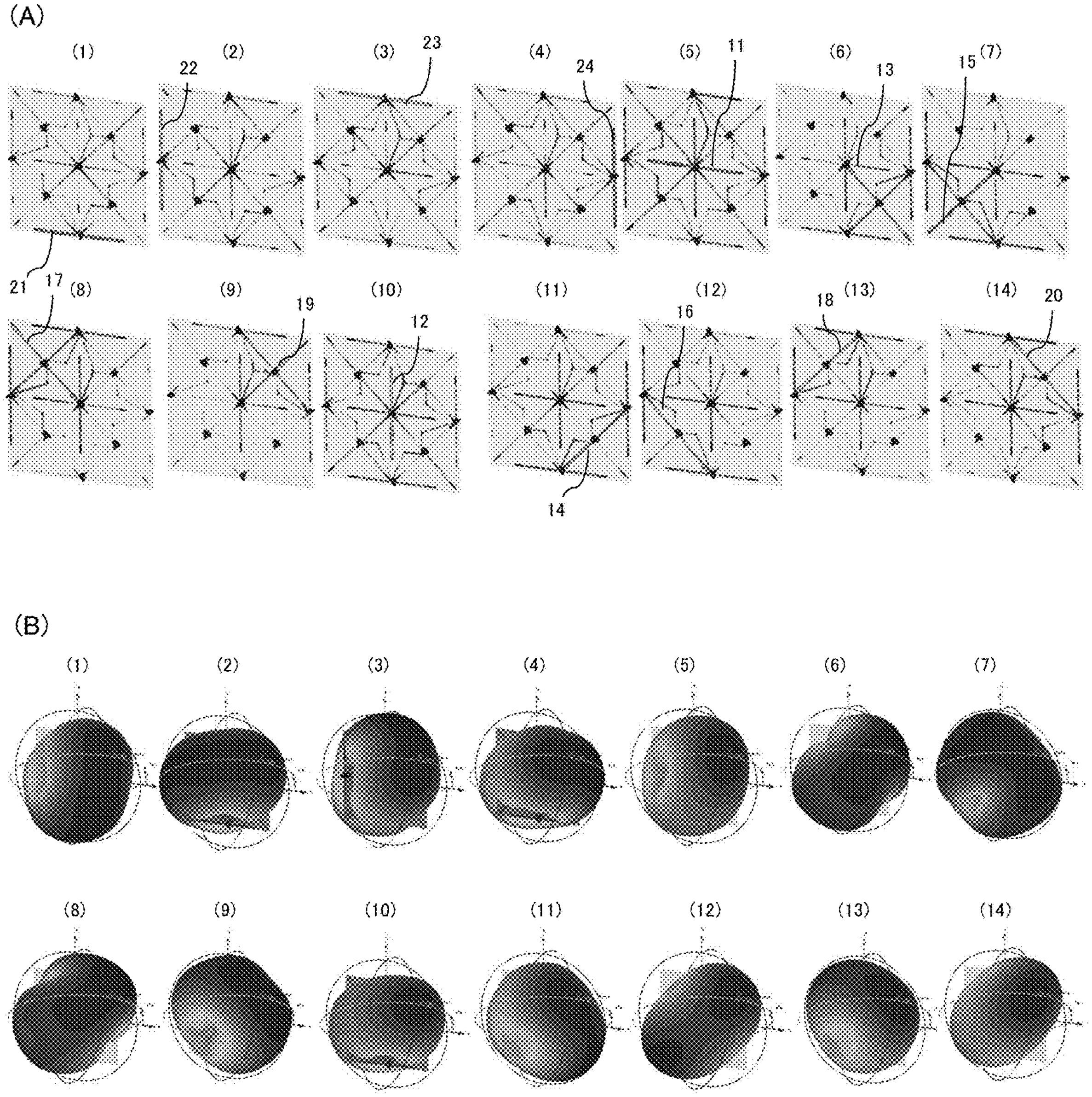
FIG. 8 is a diagram illustrating (A) current distribution and (B) radiation efficiency of the multi-antenna of FIG. 2 (A), respectively (Example 1).

In FIG. 8 (A), (1) to (4), the electric current distributions of the antennas 21 to 24 forming the outermost square shape in the multi-antenna 10 of FIG. 2 (A) are exemplified. And, in FIG. 8 (B), (1) to (4), the radiation efficiencies of the corresponding antennas in a three-dimensional space are exemplified.

In FIG. 8 (A), (5) and (10), the electric current distributions of the most central antennas 11, 12 in the multi-antenna 10 of FIG. 2 (A) are exemplified. And, in FIG. 8 (B), (5) and (10), the radiation efficiencies of the corresponding antennas in a three-dimensional space are exemplified.

In FIG. 8 (A), (6) to (9), the electric current distributions of the antennas 13, 15, 17, and 19 extending radially from the most central part of the multi-antenna 10 of FIG. 2 (A) are exemplified. And, in FIG. 8 (B), (6) to (9), the radiation efficiencies of the corresponding antennas in a three-dimensional space are exemplified.

In FIG. 8 (A), (11) to (14), the electric current distributions of the antennas 14, 16, 18, and 20 forming the square shape inclined at an angle of 45 degrees inside the multi-antenna 10 of FIG. 2 (A) are exemplified. And, in FIG. 8 (B), (11) to (14), the radiation efficiencies of the corresponding antennas in a three-dimensional space are exemplified.

As can be seen from FIGS. 8 (A), (B), the fourteen antennas included in the multi-antenna 10 illustrated in FIG. 2 (A) are capable of having various current distributions and radiation efficiencies. Accordingly, by using the fourteen antennas, the multi-antenna 10 is capable of receiving energy from different directions, as a whole. As a result, it becomes possible to configure a substantially omnidirectional power-receiving device 1 (which can receive power from any angle).

The radiation efficiencies exemplified in FIG. 8 (B) correspond to the results of electromagnetic field simulations performed in an ideal situation (in other words, in a situation in which there is no obstacle that blocks power reception) in a three-dimensional space, for each of the antennas 11 to 24 included in the multi-antenna 10.

It is assumed that, in the electromagnetic field simulation, electric currents are uniformly emitted in nearly all the directions, in the radiation pattern, as is known. However, in practice, disturbances may occur in the radiation pattern. In addition, in the electromagnetic field simulation, even if it appears on a curved surface, it may actually appear unevenly. This is because, in practice, it is intensified in the same phase, and is weakened in the opposite phase, depending on the conditions of the transmitted radio waves, in relation to the surrounding environment.

In the present embodiment, as can be seen from FIG. 8, by preparing various radiation patterns, it is expected that it is possible to maintain the various radiation patterns, as a whole, even if some of the radiation patterns do not ideally appear.

Subsequently, with referring to FIG. 9, the radiation efficiencies in the cases (1) to (14) of FIG. 8 (A), (B) are shown in a graph, respectively. The horizontal axis represents frequencies (GHz), and the vertical axis represents performances (it is supposed that numerical value of 1.0 represents the perfect performance (100%) of the idealized antenna).

As can be seen from the figure, each of the fourteen antennas is capable of having the performance of in a range from 0.8 to 0.95 at a frequency of 0.92 GHz.

It is exemplified that when the numerical values of the fourteen antennas are summed up, it can have a performance of 1207%, as a whole, with regard to a single dipole antenna. Accordingly, the power-receiving device 1 of the present embodiment can achieve a performance of 12 times or more comparing to an ideal single dipole antenna.

Figure 9:
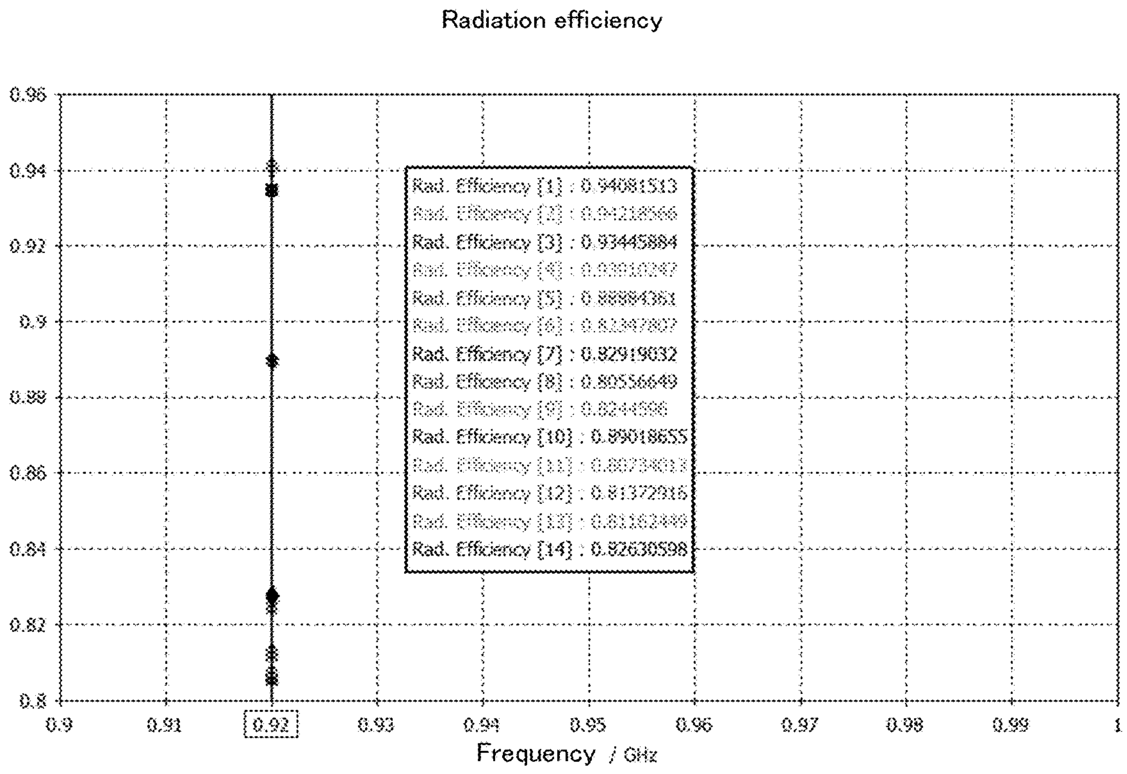
FIG. 9 is a diagram illustrating a graph showing the radiation efficiency in respective cases of FIG. 8 (A), (B) (Example 1).

It can be seen that the performance of 1207% of the power-receiving device 1 obtained from FIG. 9 is expected to be approximately four times higher than the performance of the multi-antenna illustrated in FIG. 22 (B). That is, it is expected that the performance of the power-receiving device 1 will exceed four times as large as the various types of the conventional technology illustrated in FIG. 22 (A), (1), (2), and (3). As a result, it can be seen that the performance of the power-receiving device 1 is excellent in practice.

As exemplified in FIG. 2 (B), it is possible to further improve the performance by providing a plurality of the multi-antennas 10 and/or 10'.

The radiation efficiencies illustrated in FIG. 9 correspond to the results of the electromagnetic field simulations performed under an ideal condition (in other words, in a situation in which there is no obstacle that blocks power reception) in a three-dimensional space, for each of the antennas included in the multi-antenna 10.

As described above, a dipole antenna can also be referred to as a half-wavelength (½λ) dipole antenna, and its length d can be determined based on its operating frequency f (Hz) as below:

$$d = 3\times10^8 / 2f(m)$$

or $$d = (3\times10^8 / 2f)\times(\text{any number in a range of from 0.96 to 0.97})(m)$$

Therefore, it can be expected that a skilled person will be able to schematically understand the sizes of the respective linear antennas 11 to 24 included in the multi-antenna 10 of the present embodiment according to the above descriptions. However, please notice that the sizes of the respective linear antennas 11 to 24 included in the multi-antenna 10 can be modified in various ways depending on the embodiments.

Figure 10:
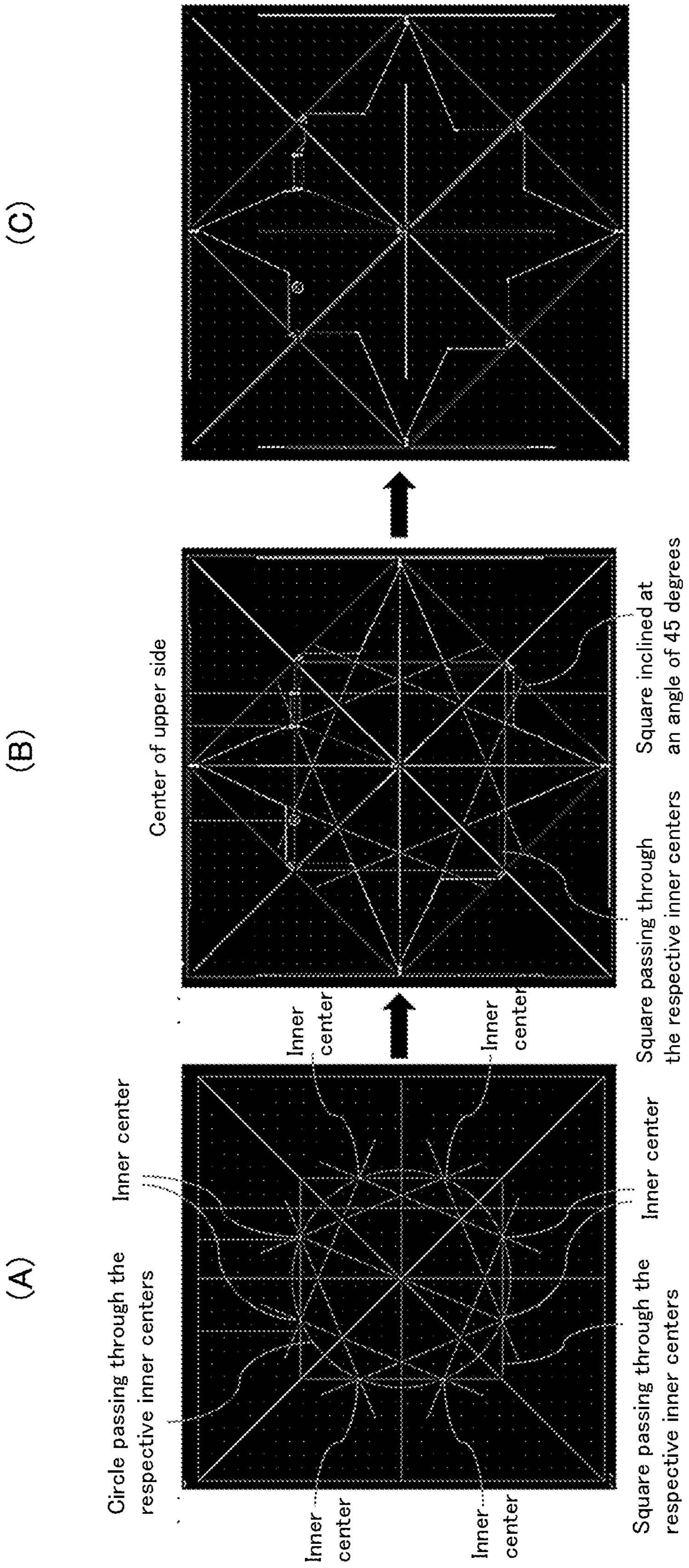
FIG. 10 is a diagram illustrating a way to configure the multi-antenna of FIG. 2 (A) in stages (A) to (C) (Example 1).

With referring to FIG. 10, the method of forming the connecting line 30 of the multi-antenna 10 exemplified in FIG. 2 (A) is illustrated.

In FIG. 10 (A), the method of drawing bisectors of inner angles formed by neighboring linear antennas is exemplified by using auxiliary lines.

As described above, the connecting line 30 is made to pass through an inner center of a triangles formed by neighboring three linear antennas. These inner centers are positioned symmetrically, vertically and horizontally.

In this example, the geometric features of the connecting line 30 can be used to algorithmize the method of designing it.

For example, in the present example, a total of eight inner centers at which the connecting line 30 passes through are positioned along a periphery of a circle.

In addition, in the present example, a total of eight inner centers at which the connecting line 30 passes through are positioned along four sides of a square.

These circle and square intersect with each other at the eight points so that it is possible to uniquely define eight positions of the inner centers at the respective intersection points.

Accordingly, it is possible to automate the method of designing the connecting line 30 by using the above-mentioned geometric properties. This algorithm can be variously configured.

In FIG. 10 (B), it is exemplified that the neighboring antennas are connected with each other in the vicinity of the bisectors of the angles formed by the neighboring linear antennas.

As illustrated in FIG. 2 (A), it is possible to define a square inclined at an angle of 45 degrees with respect to two linear antennas 11 and 12 which are arranged in a substantially cross shape at the substantially center on the substrate, by using a total of eight linear antennas 13 to 20. The contour of the connecting line 30 is uniquely defined by connecting the respective positions of the vertices (or apices) of the square inclined at an angle of 45 degrees; the respective positions of the centers of the sides; and the positions of the inner centers.

That is, once the square inclined at an angle of 45 degrees is given, it becomes possible to uniquely define a line connecting the respective vertices of the square, and the respective inner centers. In addition, it is possible to uniquely define a line connecting the respective centers of the sides of the square, and the respective inner centers. This line can be defined on the four sides of the square connecting the respective inner centers.

As illustrated in FIGS. 10 (A), (B), it is possible to regularly obtain the respective linear antennas 11 to 24 and connecting line 30, 40 constituting the multi-antenna of the present example, by using the various auxiliary lines (such as the circle and square connecting the respective inner centers).

With referring to FIG. 10 (C), a condition in which the auxiliary lines are removed is illustrated. This condition corresponds to the multi-antenna 10 illustrated in FIG. 7 (A), consisting of the linear antennas 11 to 24 and the connecting lines 30, 40.

Therefore, the multi-antenna 10 illustrated in FIG. 2 (A) can be determined regularly or algorithmically.

Please notice that the way of using the auxiliary lines and the way of defining the positions of the inner centers, etc., are not limited to the embodiment illustrated in FIG. 10, but various modifications can be made.

So far, the basic embodiment of the multi-antenna 10 illustrated in FIG. 2 (A) has been explained.

The present embodiment can be used to further enhance the omni-directivity of the multi-antenna 10 illustrated in FIG. 2 (A).

As mentioned above, in the arrangement of the approximately cross shapes in the four regions a to d which are defined by the two antennas 11 and 12 in the multi-antenna 10 in FIG. 2 (A), the respective inclination angles of the cross shapes with respect to the substrate are substantially identical. As a result, the symmetry of the connecting line 30 is maintained.

However, the present example is not limited to this embodiment. Each of the generally cross-shaped arrangements (which are formed by the antennas 13 to 20) in the four regions a to d defined by the two antennas 1, 12 may be inclined with regard to the substrate at substantially different angles, respectively.

In this case, the geometric symmetry of the connecting line 30 for connecting the respective antennas 13 to 24 is slightly impaired. However, it becomes possible to further enhance the omni-directivity of the multi-antenna 10, as a whole, by changing the directivities of the respective antennas 11 to 24.

Figure 11:
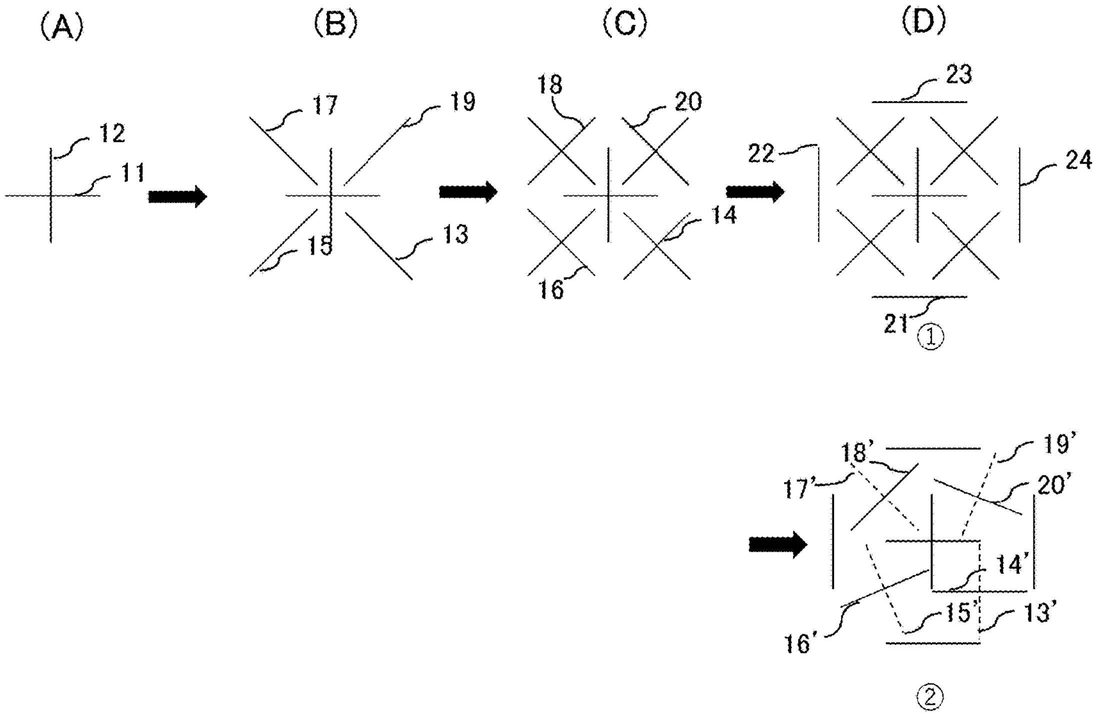
FIG. 11 is a diagram illustrating an example in which a part of FIG. 5 is modified as shown by circled numbers 1 and 2 (Example 1).

With referring to FIG. 11, the above-mentioned two embodiments are exemplified in contrast.

The upper part (1) in FIG. 11, (A) to (D) correspond to the embodiment illustrated in FIG. 5 (D). As can be seen from this figure, the inclination angles of the four cross shapes (which are formed by the linear antennas 13 to 20) are identical.

The lower part (2) in FIG. 11, (A) to (D) corresponds to the modified embodiment of FIG. 5 (D). As can be seen from this figure, the inclination angles of the four cross shapes (which are formed by the linear antennas 13' to 20') are not identical.

For example, in the part (2) of FIG. 11 (D), attention can be paid to the antennas 13', 16', 17', and 20' in the four cross shapes formed by the antennas 13' to 20'.

The lower right cross-shaped antenna 13' is provided to extend longitudinally (at an angle of 90 degrees relative to the horizontal antenna 11).

The lower left cross-shaped antenna 16' next to the above in the clockwise direction is made to be inclined at an angle of 22.5 degrees with respect to the antenna 13'.

The upper left cross-shaped antenna 17' next to the above in the clockwise direction is made to be inclined at an angle of 22.5 degrees with respect to the antenna 16'. As a result, the antenna 17' is inclined by 45 degrees with respect to the antenna 13'.

The upper right cross-shaped antenna 20' next to the above in the clockwise direction is made to be inclined at an angle of 22.5 degrees with respect to the antenna 17'. As a result, the antenna 20' is inclined by 67.5 degrees with respect to the antenna 13'.

In this way, the respective inclination angles of the cross shapes which are arranged in the four regions a to d can be stepwisely increased or decreased with respect to the substrate, by an angle of 22.5 degrees.

Please notice that the angles of rotating the four cross shapes formed by the antennas 13' to 20' are not limited to the above-mentioned embodiment. For example, the respective four cross shapes formed by the antennas 13' to 20' may be rotated stepwise at an angle of 18 degrees.

It is also possible to connect the antennas 11, 12, 13' to 20' illustrated in FIG. 11 (D), (2) by the connecting line 30 in a substantially loop shape according to the technological idea exemplified in FIG. 6. That is, in this case as well, a connecting line can be drawn along a bisector of an inner angle formed by two sides of a triangle so as to pass through an inner center of the triangle. Since the four cross shapes formed by the antennas 13' to 20' are inclined at different angles respectively, the final shape of the connecting line 30 is made to be adjusted. As with the above case, it is also possible to draw a connecting line (not shown) in order to minimize an interference between the neighboring antennas which are proximate to each other.

In this way, as exemplified in FIG. 11 (D), part (1), it is possible to place antennas (especially, antennas 13 to 20) to have an angle of 45 degrees or above between the neighboring antennas.

Also, as exemplified in FIG. 11 (D), part (2), each of the antennas (especially, antennas 13' to 20') can be rotated at an angle of 22.5 degrees or 18 degrees in a clockwise or anti-clockwise direction, comparing to the above-mentioned part (1), to enhance the omni-directivity (or capability to receive energy from any angle) of the antennas.

When priority is given to enhance the omni-directivity of the multi-antenna 10, even just a little, the multi-antenna illustrated in FIG. 11 (D), part (2) is preferred. On the other hand, when priority is given to enhance the geometric symmetry or the aesthetic appearance of the multi-antenna 10, the multi-antenna illustrated in FIG. 11 (D), part (1) is preferred.

Figure 12:
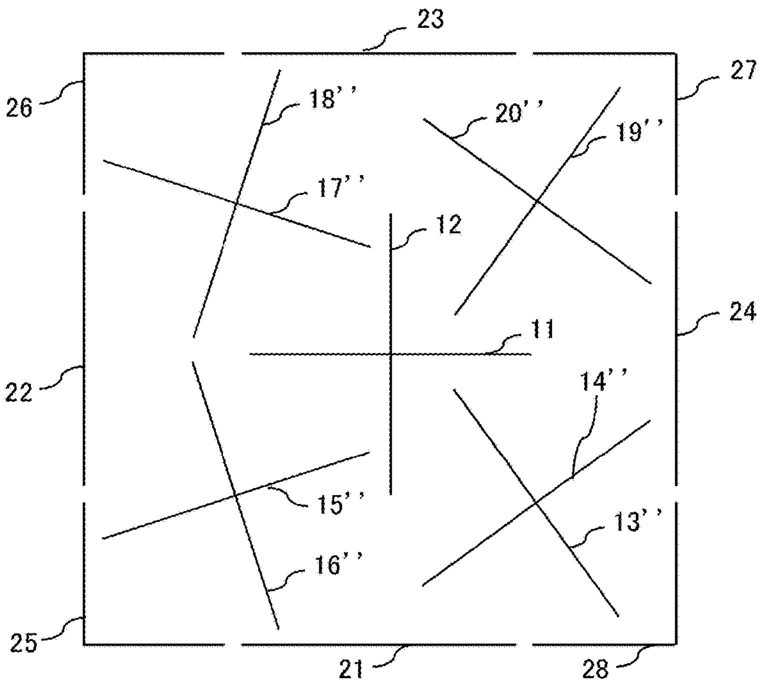
FIG. 12 is a diagram illustrating an example in which a part of FIG. 5 is modified (Example 1).

With referring to FIG. 12, another embodiment of the multi-antenna 10 of FIG. 2 (A) for enhancing the omni-directivity is illustrated.

Similarly, the embodiment illustrated in FIG. 12 corresponds to a modification of the embodiment of FIG. 5 (D).

In FIG. 5 (D), the four linear antennas 21 to 24 are arranged along the four sides of the square shape, on the outermost side of the multi-antenna 10.

On the contrary, in FIG. 12, four linear antennas 25 to 28 are added along four corners of the square shape. In this case, each one of the linear antenna 25 to 28 is configured to have a rectifier at its center, and to have antenna portions at the both sides to extend the same length and to intersect each other at an angle of 90 degrees at the corner.

Please notice that it is possible to provide only the linear antennas 21 to 24 which are extending straight on the outermost side of the multi-antenna 10. It is also possible to provide only the linear antennas 25 to 28 which are made to be bent at right angles on the outermost side of the multi-antenna 10. In addition, it is also possible to provide an arbitrary combination of the linear antennas 21 to 24 made to extend straight and the linear antennas 25 to 28 made to bent at right angles on the outermost side of the multi-antenna 10.

Furthermore, in the embodiment of FIG. 12, in comparison to the embodiment of FIG. 11 (D), part (2), the antennas forming the four cross shapes (or linear antennas 13" to 20") which are arranged around the central cross-shape formed by the antennas 11, 12 are inclined in contrast with the longitudinal (up-down) direction and/or the lateral (left-right) direction. In the embodiment illustrated in FIG. 12, each of the four cross shapes formed by the antenna 13' to 20' is rotated stepwise at an angle of 18 degrees.

This embodiment is devised to enhance the omni-directivity of the multi-antenna 10 while maintaining the geometric symmetry of the multi-antenna 10.

For example, in FIG. 12, attention can be paid to the four cross shapes formed by the antennas 13" to 20".

The lower right antennas 13", 14" forming the cross-shape may be arranged in a mirror image relationship with the upper right antennas 19", 20" forming the cross-shape, on the basis of the lateral direction (or the horizontal antenna 11).

The lower left antennas 15", 16" forming the cross-shape may be arranged in a mirror image relationship with the upper left antennas 17", 18" forming the cross-shape, on the basis of the lateral direction (or the horizontal antenna 11).

The lower right antennas 13", 14" forming the cross-shape may be arranged in a non-mirror image relationship with the lower left antennas 15", 16" forming the cross-shape, on the basis of the longitudinal direction (the vertical antenna 12).

Please notice that it is also possible to arrange these four cross shapes in contrast in the longitudinal direction and/or the lateral direction, at any angle.

As described above, each of the four cross shapes formed by the antennas 13 to 20 which are arranged around the central cross shape formed by the antennas 11, 12 is capable of having a substantially non-identical inclination angle with respect to the substrate.

Each arrangement of the four generally cross shapes may have a substantially non-identical inclination angle, regularly, with respect to the substrate.

For example, the inclination angle of each arrangement of the four generally cross shapes may be gradually increased or decreased with respect to the substrate.

For example, the inclination angle of each arrangement of the four generally cross shapes may be stepwisely increased or decreased, at an angle of 18 degrees with respect to the substrate, when seen in a clockwise or anti-clockwise direction.

For example, the inclination angle of each arrangement of the four generally cross shapes may be stepwisely increased or decreased, at an angle of 22.5 degrees with respect to the substrate, when seen in a clockwise or anti-clockwise direction.

Also, each of the arrangements of the four generally cross shapes may increase or decrease the inclination angle, exponentially, with respect to the substrate.

Also, the inclination angle of each of the four general cross-shaped arrangements may be set so as to have a mirror image relationship with respect to the substrate between two sets of the upper and lower ones and/or two sets of the left and right ones, respectively.

However, in any case, the connecting line passing between two adjacent antennas is arranged along a bisector of an inner angle formed by these two antennas, and made to pass through an inner center of the triangle formed by the neighboring three antennas.

As mentioned above, the multi-antenna 10 illustrated in FIG. 2 (A) may be juxtaposed vertically and/or horizontally as illustrated in FIG. 2 (B). As a result, by this arrangement, the amount of receiving power is significantly increased (about four times).

However, in this case, a specific contrivance is required to connect a plurality of multi-antennas 10 to one.

Hereinafter, with referring to FIG. 13 (A) to (D), the method of juxtaposing a plurality of multi-antennas 10 vertically and/or horizontally will be described.

As stated above, there can be a various of ways for juxtaposing a plurality of multi-antennas 10 vertically and/or horizontally.

For example, in the embodiment illustrated in FIG. 2 (B), two adjacent multi-antennas 10, 10 are spaced apart from each other not to share any of the outermost antennas 21 to 24.

In contrast, in the embodiment illustrated in FIG. 14, two adjacent multi-antennas 10, 10 are made to share one of the outermost antennas 21 to 24, respectively.

Also, in the embodiment illustrated in FIG. 3 (B), the two adjacent multi-antennas 10', 10' do not share the outermost antennas 21 to 24, respectively.

Also, in the embodiment illustrated in FIG. 4 (A), the two adjacent multi-antennas 10, 10 are vertically and/or the horizontally offset.

Also, in the embodiment illustrated in FIG. 4 (B), the two different multi-antennas 10, 10' are alternatively arranged vertically and/or the horizontally, respectively.

In addition, it is possible to have an arbitrary combination of them.

Hereinafter, the embodiment illustrated in FIG. 2 (B) will be mainly described. Please notice that it is possible to apply the contents of this descriptions to other embodiments.

Figure 13:
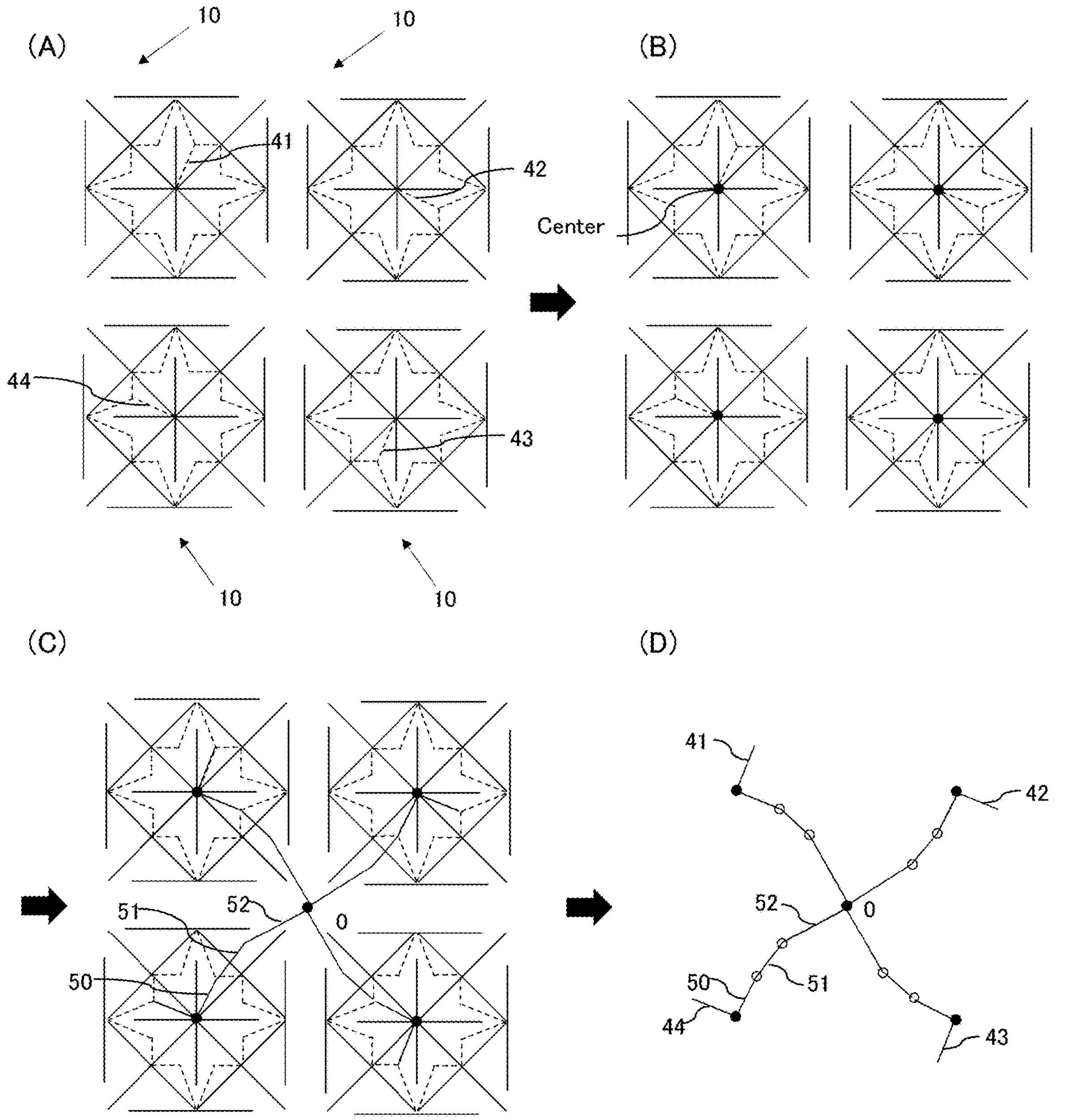
FIG. 13 is a diagram illustrating a way to connect a plurality of multi-antennas in stages (A) to (D) (Example 1).

With referring to FIG. 13 (A), basically, the application example of the arrangement of the multi-antenna 10 exemplified in FIG. 2 (B) is illustrated. Please notice that the directions of the connecting lines 41 to 44 for connecting the central two linear antennas 11, 12 with the other linear antennas 13 to 24 are made to be different in each multi-antenna 10.

Preferably, the directions of the connecting lines 41 to 44 are rotated in a clockwise or anti-clockwise direction for each of the four regions a to d which are defined by the central two linear antennas 11, 12. As a result, it is possible to obtain the overall symmetry of the connecting lines for connecting the respective multi-antennas 10 together.

With referring to FIG. 13 (B), for convenience, the structural centers of the four multi-antennas 10 are indicated by black dots. It is assumed that connections can be made from the black dots to the back surface of the substrate. The structures of the multi-antennas 10 are basically formed on a surface of the substrate, excluding the black dots. The same applies to the case where the front surface and the back surface of the substrate are reversed.

With referring to FIG. 13 (C), for convenience, it is illustrated that the respective black dots are connected with a center point O of all antennas (or the center point of the substrate). It means that the respective multi-antennas 10 can be connected in series or in parallel.

For example, explanation is given to the lower left multi-antenna 10 among the four multi-antennas 10.

The center point of the lower left multi-antenna 10 is connected with the center point O of the all antennas by a single connecting line. This connecting line is configured to include a connecting line 50 corresponding to a bisector of an inner angle formed by the antennas 12, 19; a connecting line 51 which crosses with the antenna 20 at an angle of 90 degrees to be connected with the connecting line 50; and a connecting line 52 for connecting the center point O of the all antennas with the connecting line 51.

The connecting lines 50, 51 and 52 are similarly configured for the other multi-antennas 10.

By connecting the multi-antennas 10 in this way, it becomes possible to suppress an interference between adjacent antennas to prevent electromagnetic coupling from occurring.

The method of connecting the respective black dots is the same as the way to connect the respective multi-antennas 10, and the connection is performed to pass through the intersection points (or inner centers) of bisectors of corners formed between the neighboring antennas. Each inner center is indicated by a black circle (which is a circle without a fill).

With referring to FIG. 13 (D), it is illustrated that the connecting lines 50, 51, and 52 for the four multi-antennas 10 are taken from the whole. Together with those, the connecting lines 40, 41, 42 and 43 of the respective multi-antennas 10 are also taken from the whole.

As can be seen from the figure, finally, the connecting lines of the four multi-antennas 10 can be arranged, as a whole, in a swastika shape or in an inverted swastika shape. Thus, the four multi-antennas 10 formed by a plurality of linear antennas can be provided with geometric symmetry. As a result, it becomes possible to make clear the manufacturing process of the product and to enhance the aesthetic appearance thereof comparing the case where the four multi-antennas are connected in a more complicated way. Further, it is considered that the embodiment is preferable to prevent an interference between the neighboring antennas.

So far, in the embodiments described above with referring to FIGS. 1 to 13, the multi-antennas 10, 10' are configured in a planar shape.

However, the present embodiments are not limited to these shapes.

For example, the planar multi-antennas 10, 10' are capable of being arranged on a curved surface.

Also, one or a plurality of the illustrated planar multi-antennas 10, 10' are capable of being arranged on different surfaces, each intersecting at different angles in a three-dimensional space.

With referring to the upper part of FIG. 14, the multi-antennas 10 illustrated in FIG. 2 (A) are disposed on all of the six surfaces of a hexahedron when it is developed as can be seen in the expanded view of the hexahedron.

With referring to the lower part of FIG. 14, a power-receiving device which is obtained by folding the above-mentioned expanded view into a hexahedron is illustrated. In the power-receiving device, the six multi-antennas 10 are arranged three-dimensionally.

In this way, it is possible to arrange the multi-antennas 10, 10' in each of at least two surfaces which are arranged on non-coplanar surfaces.

For example, the multi-antennas 10, 10' may be provided on one or more surfaces in a hexahedron.

Also, the multi-antennas 10, 10' may be provided on one or more surfaces in another polyhedron.

Furthermore, the arrangement of the multi-antenna 10, 10' is not limited to the manner in which the outer frame thereof is formed to be substantially rectangular when it is arranged in a planar or three-dimensional manner. For example, it is possible to use a honeycomb shape, or a substantially polygonal shape, or the like.

As described above, in the embodiments described with referring to FIGS. 1 to 14, the antennas are arranged efficiently in a constant area. At the time, a general cross shape having two linear antennas crossing each other at an angle of 90 degrees is used as a basic shape.

However, the present embodiment is not limited to this case. For example, the present embodiment may be based on a substantially radial shape (or substantially star shape) in which three linear antennas intersect at substantially one point for the outer frame.

Figure 15:
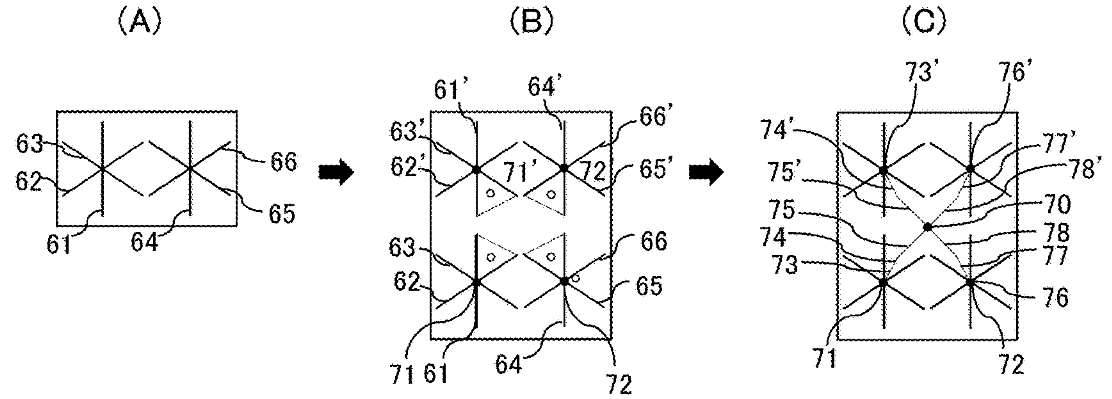
FIG. 15 is a diagram illustrating an example in which a part of FIG. 2 (A) is modified in stages (A) to (C) (Example 1).

For example, with referring to FIG. 15 (A), it is illustrated that a multi-antenna 10" can depend on a basic shape in which three linear antennas 61 to 63 intersect at substantially one point, and the multi-antenna 10" can be formed by juxtaposing a plurality of the basic shapes. At the time, the three linear antennas 61 to 63 meeting at substantially one point are formed as one set, and two or more sets are juxtaposed in the vertical direction and/or in the horizontal direction.

For example, in FIG. 15 (A), it is illustrated that three linear antennas 61 to 63 meeting at substantially one point, and three linear antennas 64 to 66 meeting at substantially one point are juxtaposed in the horizontal (left-right) direction.

In FIG. 15 (A), a black frame is depicted, for the sake of convenience, to indicate that it is inside a PCB substrate.

With referring to FIG. 15 (B), it is illustrated that the two sets of the antennas 61 to 63 and the antennas 64 to 66 which are laterally arranged are further repeated symmetrically in the longitudinal (up-down) direction.

The antennas 61' to 63' may be arranged symmetrically in the longitudinal direction and/or the lateral direction in comparison with the antennas 61 to 63.

The antennas 64' to 66' may be arranged symmetrically in the longitudinal direction and/or the lateral direction in comparison with the antennas 64 to 66.

With referring to FIG. 15 (B), circle marks are depicted to indicate inner centers of triangles at which bisectors of inner angles formed by neighboring two linear antennas pass through.

For example, a triangle is formed by the linear antennas 61, 62, and an imaginary line indicated by a dotted line. The circle mark corresponds to the inner center of the triangle.

Each one of the inner centers indicated by a total of four circle marks is selected to be closest with the center of the substrate.

By drawing a connecting line so as to pass through these four circle marks, a total of twelve antennas 61 to 66, and 61' to 66' illustrated in FIG. 15 (B) are allowed to be connected to one.

With referring to FIG. 15 (C), it is illustrated that the three linear antennas extending in a radial shape are formed as one set, and the four sets (61 to 63, 64 to 66, 61' to 63', and 64' to 66') are respectively connected with the center point 70.

For example, in the set of the three antennas 61 to 63 at the lower left, a connecting line 73 corresponding to the bisector of the inner angle formed by the adjacent linear antennas 61 and 62 is drawn to start from the intersection 71 to which the three antennas 61 to 63 are connected.

Please notice that the connecting line 73 is made to pass through the inner center 74 corresponding to the circle mark illustrated in FIG. 15 (B). The direction of the connecting line 73 is changed at the inner center 74 to reach at the center point 70 of the substrate.

Similarly, the connecting lines can be drawn to connect the respective center points 72, 71', 72' with the center point 70 of the substrate, for the other three sets of the antennas (64 to 66, 61' to 63', and 64' to 66').

As a result, a total of twelve linear antennas (61 to 63, 64 to 66, 61' to 63', and 64' to 66') are all connected at the center point 70 of the substrate.

As described above, in the case of the multi-antenna 10" illustrated in FIG. 15, the method of connecting the respective linear antennas can be performed in the same manner as in the cases of the multi-antennas 10, 10' illustrated in FIGS. 1 to 14.

In particular, as in the case where two linear antennas intersect at approximately one point, even if three linear antennas intersect at approximately one point, the connecting line can be selected to pass through an inner center along a bisector of an inner angle formed by two sides of a triangle.

Please notice that, in the case of the multi-antenna 10" illustrated in FIG. 15, various modifications can be made similarly to the cases of the multi-antennas 10, 10' illustrated in FIGS. 1 to 14.

So far, in the examples illustrated in FIGS. 1 to 15, all of the multi-antenna 10, 10', 10" shares a common feature of connecting a plurality of linear antennas into one.

For example, in the embodiment illustrated in FIG. 2 (A), a plurality of linear antennas 11 to 24 are connected in a substantially loop shape by the connecting lines 30, 40.

In particular, the connecting line 30 is symmetrically arranged in the vertical direction and in the horizontal direction, and is made to be bent at eight inner centers. Subsequently, the method of supporting the characteristic arrangement and connection will be described.

Example 2

Figure 16:
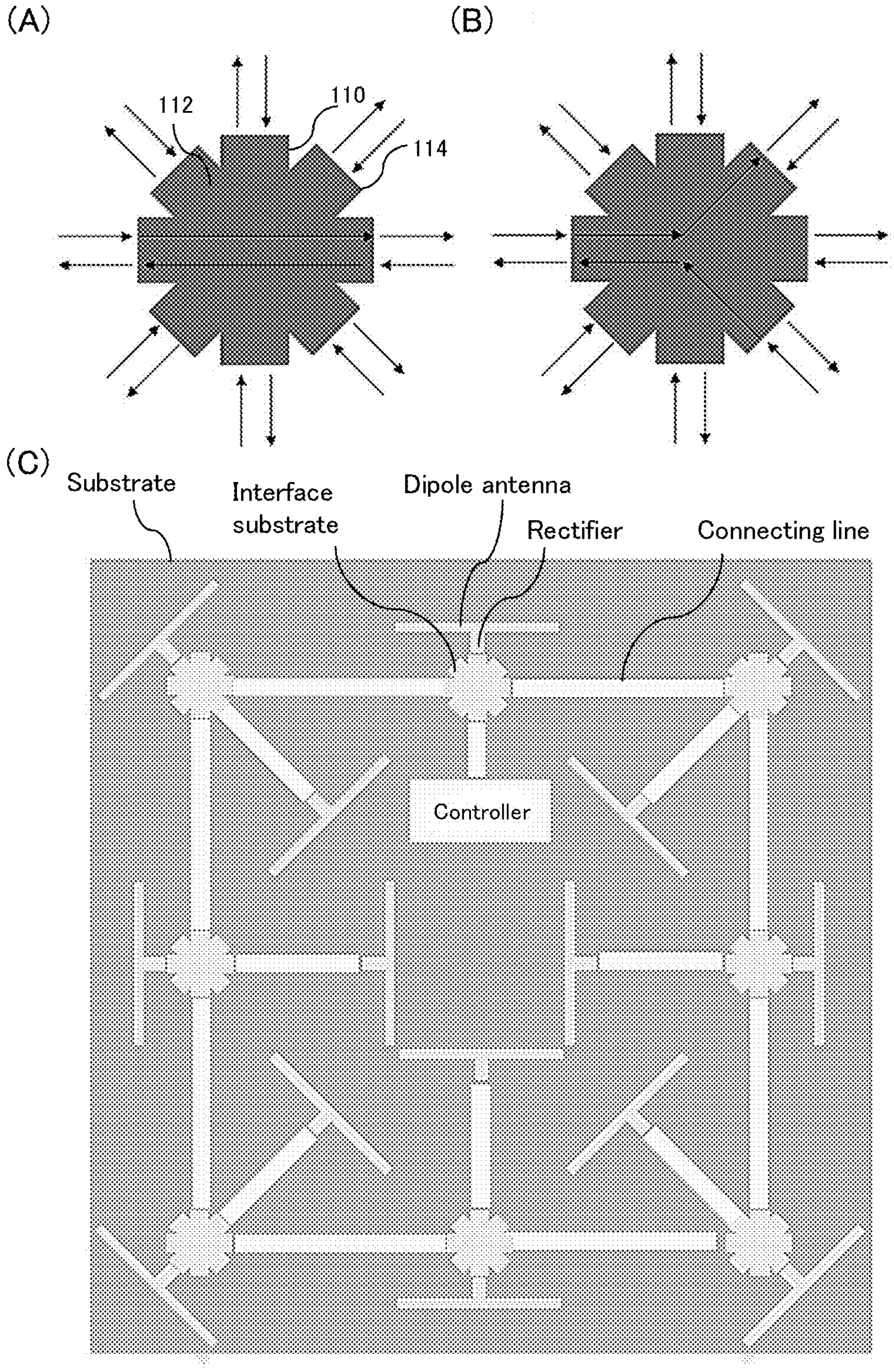
FIG. 16 is a diagram illustrating examples (A), (B) and (C) of interface substrates for assisting the arrangement and connection of antennas (Example 2).

With referring to FIGS. 16 (A) and (B), an interface substrate (which is a small substrate) 110 for supporting the arrangement and connection of the linear antennas 11 to 24, the connecting lines 30, 40, etc., which are included in the multi-antenna 10, 10', 10", etc., is exemplified.

The main body 112 of the interface substrate 110 is constituted in a polygonal shape. In this embodiment, it is formed on the basis of an equilateral octagon. In the equilateral octagon, each side has the same length, each angle has the same angle of 135 degrees, and each exterior angle has the same angle of 45 degrees.

The main body 112 of the interface substrate 110 is formed in a polygonal shape, and each corner 114 of the main body is made to be capable of disposing a connector for performing two-terminal connection.

The interface substrate 110 facilitates its application to the respective connecting parts of the multi-antenna 10, 10', 10", which is capable of being configured geometrically symmetrically or fractally.

As illustrated in FIGS. 16 (A) and (B), the interface substrate 110 is capable of forming a flow of electric current variously inside the body 112, by using connectors disposed in a plurality of corners, The interface substrate 110 illustrated in FIG. 16 (A), (B) can be used in combination with the linear antennas (or dipole antennas) of any one of the multi-antennas 10, 10', 10", rectifiers integral with the linear antennas, and a FPC cable(s).

By using a plurality of these interface substrates, it is possible to configure a multi-antenna having various shapes as illustrated in FIG. 16 (C).

With referring to FIG. 16 (C), the application example of the interface substrate 110 with regard to the multi-antenna consisting of a plurality of linear antennas is illustrated.

Each linear antenna has a rectifier at its center and is made to be capable of being connected to the interface substrate at that position. The interface substrate is capable of being connected to a FPC cable or a controller, etc., at other connector locations.

A switching mechanism is provided in the interface substrate to freely change and select a connection with the linear antenna, the FPC cable and the controller In the interface substrate 110 illustrated in FIGS. 16 (A) and (B), it is possible to configure a switch to freely change the connection inside the main body 112.

As illustrated in FIGS. 16 (A) and (B), the entire interface substrate 110 may be configured to have "two inputs" when it is connected with each antenna, or to have "one input and one output" when it is in the middle of only making an angle of two outputs.

The switches in the interface substrate are made to be controlled by the controller so as to reconfigure the antenna (as reconfigurable antenna).

By using the interface substrate, it becomes possible to make the connection in all patterns with only three types of substrate patterns (in this case, the mounted component is switched each time). In this case, it is possible to configure all the parts as a flexible substrate to be mounted on only a single surface. Therefore, it is advantageous in its design and manufacturing.

By using the interface substrate 110, it becomes possible to easily cope with the design changes of the multi-antenna.

In addition, it becomes possible to increase the resistance even when a load such as a strong stress or heat, or the like is applied to the multi-antenna, by using the interface substrate 110.

Furthermore, it becomes possible to be harmonized with the surrounding environment by accommodating the interface substrate 110 into a housing, by joining the interface substrate 110 with a solder, a connector, a tape, or the like.

Figure 17:
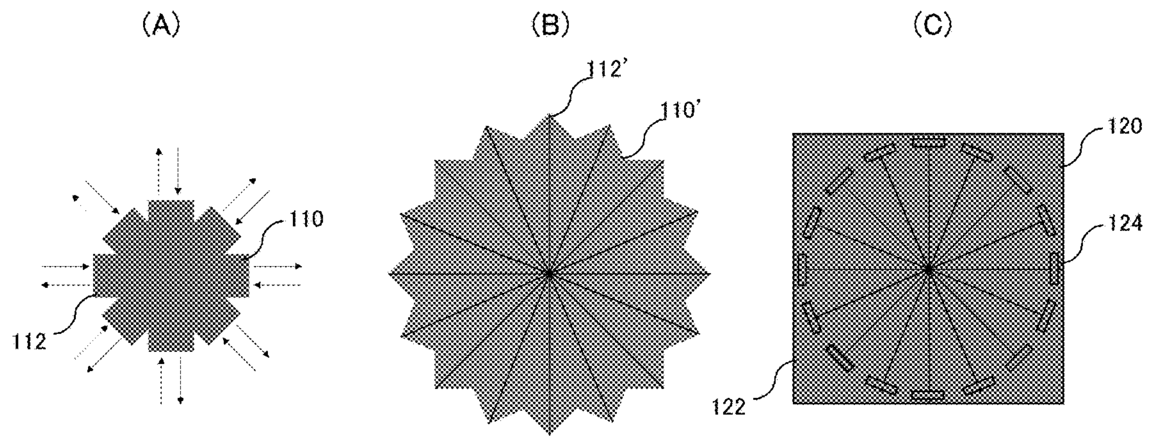
FIG. 17 is a diagram illustrating examples (A), (B) and (C) of interface substrates for assisting the arrangement and connection of antennas (Example 2).

With referring to FIG. 17 (A) to (C), other embodiments of the interface substrate of FIG. 16 (A), (B) are illustrated.

According to the interface substrate 110 having an equilateral octagon as illustrated in FIG. 17 (A), the number of installation positions of two-terminal connectors is limited to eight, as illustrated in FIG. 16 (A), (B). In addition, an angle formed between the neighboring connectors is made to be 45 degrees, and it is not allowed to connect two connecting lines at an angle smaller than the above-mentioned angle of 45 degrees. Since the main body 112 of the interface substrate 110 is formed on the basis of the equilateral octagon, there is a risk that the manufacturing cost is likely to be increased due to its outline defined as such.

With referring to FIG. 17 (B), (C), improvements on the interface substrate 110 which are formed on the basis of the equilateral octagon of FIG. 17 (A) are illustrated With referring to FIG. 17 (B), a body 112' of a flexible interface substrate 110' which is modified to be a regular hexadecagon is exemplified. In this case, since the number of the installation positions of the connectors is increased, the outline becomes more complicated.

With referring to FIG. 17 (C), a body 122 of a flexible interface substrate 120 which is modified to be a regular hexadecagon is exemplified. In this case, the outline is made to be more simplified.

As illustrated in FIG. 17 (C), the flexible substrate 120 is capable of connecting two-terminal connectors at a total of sixteen different positions 124 on the main body 122. The angle formed between the neighboring connectors 124 is made to be 22.5 degrees so that it is capable of being applied to many embodiments of the multi-antennas 10, 10', 10" described in Example 1.

In addition, the flexible substrate 120 is capable of connecting two-terminal connectors at a total of twenty different positions 124 on the main body 122. In this case, the angle formed between the neighboring connectors is made to be 18 degrees, and it may be further applicable to more embodiments of the multi-antennas 10, 10', 10" as described in Example 1.

Furthermore, please notice that it is possible to increase the number of the positions to arrange the two-terminal connectors on the main body 122 of the flexible substrate 120.

Further, in the embodiment illustrated in FIG. 17 (C), the outline of the main body 122 of the flexible substrate 120 is formed into a substantially quadrangular shape (to be placed on a single substrate having a square shape). That is, by simplifying the shape of the main body 122 (to have a substantially square shape in a plane view) while maintaining the positions 124 of various two-terminal connectors on the surface of the main body 122, the increase in the manufacturing cost due to the complicated contour is suppressed.

In this case, it is possible to form the main body 122 into a substantially rectangular shape and to arrange a plurality of two-terminal connectors thereon while shifting the positions of the two-terminal connectors in the height direction.

Figure 18:
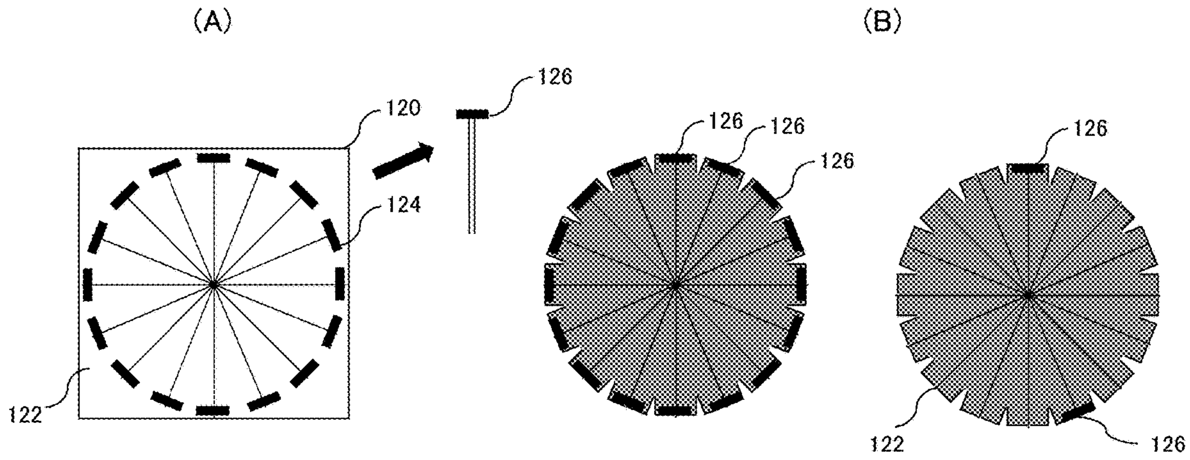
FIG. 18 is a diagram illustrating examples (A) and (B) of interface substrates for assisting the arrangement and connection of antennas (Example 2).

As illustrated in FIG. 18 (A), it is possible to arrange the two-terminal connectors at the respective positions 124 of the body 122 of the flexible substrate 120 having a regular hexadecagon. In this case, although the connector is shown schematically as a single line, in reality, the connector is configured to have two wirings, as a pair of a connector and a wiring. The outer frame of the main body 122 refers to the outer frame of the PCB substrate.

As illustrated in FIG. 18 (B), it is possible to attach the two-terminal connectors at all the positions 124 of the regular hexadecagon of the flexible substrate 120.

Alternatively, it is also possible to attach the two-terminal connectors 126 at positions that are necessary (for example, at two positions) among the sixteen positions 124 of the flexible substrate 120. Accordingly, it becomes possible to realize facilitation of the application to the design changes of the flexible substrate 120 and to realize suppression of the manufacturing cost.

Figure 19:
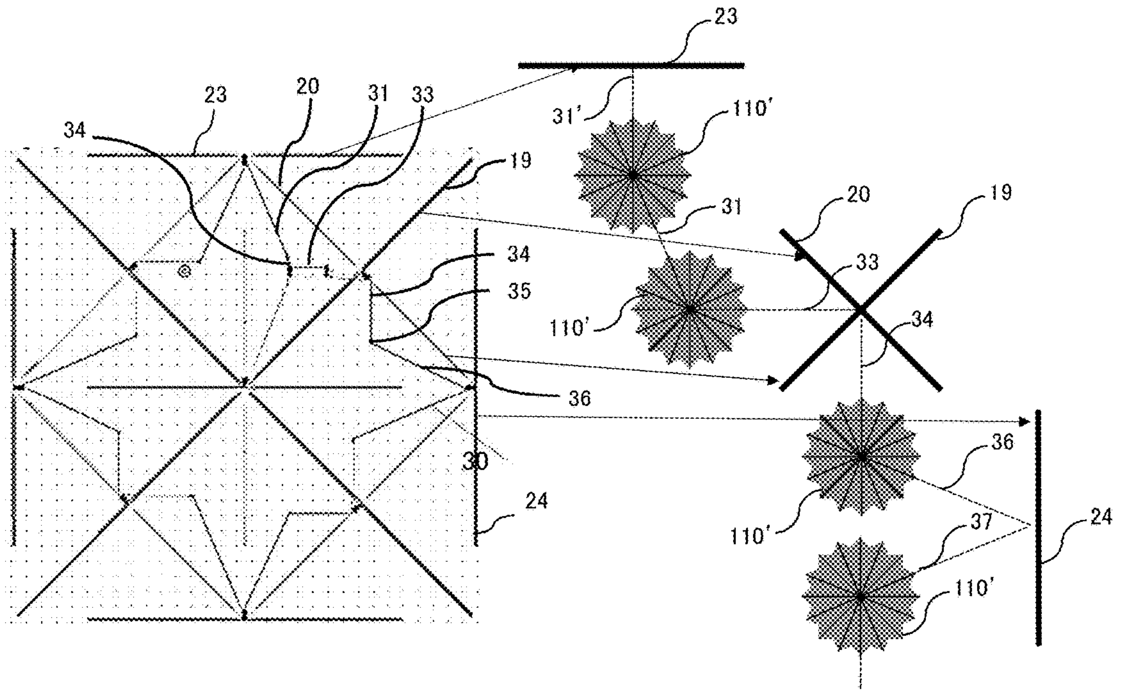
FIG. 19 is a diagram roughly illustrating an example in which the interface substrates of FIG. 17 (B) are used in the multi-antenna of FIG. 2 (A)

With referring to FIG. 19, it is illustrated that the multi-antenna 10 of FIG. 2 (B) can be configured by using a plurality of the flexible substrates 110', 120 illustrated in FIGS. 17, 18.

The respective directions at the positions of the linear antennas 11 to 24 and the connecting lines 30, 40, both of which are provided to constitute the multi-antenna 10, are changed in various ways. Even in this case, it is possible to apply the flexible substrates 110', 120 illustrated in FIG. 18 to all the connecting positions.

By using the flexible substrate 110', 120, it becomes easy to configure the multi-antenna 10. Although the flexible substrate 110' is used in FIG. 19, it is also possible to use the flexible substrate 120 instead of that.

For example, in FIG. 2 (B), it is illustrated that the connecting line 31 intersects the linear antenna 23 located on the outermost upper side of the multi-antenna 10 at an angle of 67.5 degrees. But, there are cases that these two are required to be offset from one another, for implementation.

In FIG. 19, it is illustrated that a connecting line 31' extending directly below is added to be connected with the linear antenna 23 which is arranged at the outermost upper side, at a position a little below thereof. These two parts can be connected using the flexible substrate 110'.

In other words, the connecting lines 31, 31' can be connected via the two-terminal connector of the flexible substrate 110'. At the time, the connecting line 31 is connected to the two-terminal connector of the other flexible substrate 110' at the opposite end. The flexible substrate 110' is connected to the connecting line 33 extending laterally at another two-terminal connector located at different position.

According to the present embodiment, the connecting line 31 is arranged along the bisector of the inner angle formed by the two linear antennas 12 and 20 which are arranged close to each other. It can be inferred that the work may take much time to directly perform this arrangement and connection on the substrate.

However, according to the present embodiment, it is possible to simply and quickly arrange and connect the connecting line 31 along the bisector of the inner angle, only by connecting the connecting line 31, etc., to the connector located at a predetermined position on the flexible substrate 110'.

As described above, the direction of the connecting line 31 is changed at the inner center 32 of the triangle formed by the neighboring three linear antennas 12, 20, and 19. Furthermore, it is connected to the connecting line 33 arranged along the bisector of the inner angle formed by the neighboring two linear antennas 19 and 20 which are arranged closely. It can be inferred that the work may take much time to directly perform this arrangement and connection on the substrate, for implementation.

However, according to the present embodiment, it is possible to simply and quickly arrange the connecting line 31 along the bisector of the inner angle, change the direction thereof at the inner center 32, and connect it with the other connecting line 33, only by connecting the connecting lines 31, 33 to the connector located at a predetermined position on the flexible substrate 110'. At the time, it is possible to automatically determine the position of the inner center 32 as the center position of the flexible substrate.

As described above, it is possible to effectively obtain the connecting line 30 having a comparatively complicated shape, by connecting the connecting lines 31, 33, etc., to the connector of the flexible substrate 110', based on the design of the multi-antenna 10. Furthermore, since the center position of the flexible substrate 110' is arranged at a place (or inner center) where the direction of the connecting line 30 is changed, the strength of the multi-antenna 10 is increased. As a result, it becomes possible to achieve the resistance of the multi-antenna 10 even when a relatively strong load such as a stress or heat is applied thereto.

So far, explanations are given concerning the multi-antenna 10, 10', 10", and the flexible substrate 110', 120, with referring to FIGS. 1 to 19.

Subsequently, with referring to FIG. 20 (A), (B), the power-receiving device 1 including the multi-antenna 10, 10', 10" and the flexible substrate 110', 120 which are illustrated in FIGS. 1 to 19 will be described.

"Application Example of Power-Receiving Device 1"

As described above, in the present embodiment, it is possible to wirelessly transmit energy to any one of a PC, a sensor, an actuator, a robot, an equipment, and the like according to a WPT (or wireless power transmission). This embodiment can be variously configured.

With referring to FIG. 20 (A), the application example of the power-receiving device 1 based on the WPT is schematically illustrated. As depicted in the figure, a power-transmitting device is provided outside the power-receiving device 1, and the power-transmitting device is configured to transmit energy E to the outside. The multiple antenna 10, 10', 10" is accommodated inside the power-receiving device 1 so as to receive energy E wirelessly transmitted from the outside. The power-receiving device 1 is capable of being connected with MCU (or controller) by wire, and of transmitting data regarding the power receiving conditions to the MCU. For example, the power-receiving device 1 is capable of feeding back the received power amounts to the MCU.

With referring to FIG. 20 (B), a schematic diagram of a usage mode of the power-receiving device 1 is illustrated. As described above, the power-receiving device 1 including the multi-antennas 10, 10', 10" which is capable of being configured in a planar manner, a curved manner, or a three-dimensional manner, can be applied in various embodiments such as the desk mat illustrated in FIG. 1 (A), the object illustrated in the lower part of FIG. 14, or the like. In FIG. 20 (B), other application examples of the power-receiving device 1 are schematically illustrated using reference numerals 1*a* to 1*e*.

For example, the power-receiving device 1*a* may be in a form to be suspended from a ceiling in a three-dimensional space. For example, the power-receiving device 1*a* may be provided in a form of an illumination which is suspended from a ceiling by a cord or a chain, etc. The power-receiving device 1*a* may be arranged by using a plane surface or a curved surface of an umbrella or a shade of the illumination. The power-receiving device 1*a* may be in any form which is suspended from a ceiling, apart from an illumination.

For example, the power-receiving device 1*b* may be in a form which is intended to be attached on a wall of a room in a three-dimensional space. For example, the power-receiving device 1*b* may be provided in a form of a wall clock which can be fixed on a wall or a column by a screw or a nail, etc. The power-receiving device 1*a* may be arranged by using a clock board of the wall clock. The power-receiving device 1*b* may be in any form which is attached on a wall or a column, apart from a clock.

For example, the power receiver 1*c* may be in a form of standing or self-standing on a floor in a three-dimensional space. For example, the power-receiving device 1*c* may be provided in a form of a frame or a plate provided for a picture or a poster, etc., put on an installation table or a tripod placed on a floor. A multi-antenna may be provided by using the inside space of the frame. The power receiver 1*c* may be in any form that is self-supporting on a floor, apart from a picture or a poster.

For example, the power-receiving device 1*d* may be in a form which is provided on a floor in a three-dimensional space. For example, the power-receiving device 1*d* may be provided in a form of a shelf or a desk. For example, the power-receiving device 1*d* may be provided by using at least a single side of a shelf or a desk. The power receiver 1*d* may be in any form that is provided on a floor, apart from a shelf or a desk. For example, the power receiver 1*d* may be configured to place a multi-antenna on a side surface of a seat or an object that is placed on a desk.

For example, the power-receiving device 1*e* may be in a form which is movable in a three-dimensional space. For example, the power-receiving device 1*e* may be provided on a side surface of a business bag or a handheld bag. For example, a multi-antenna may be provided using a substantially rectangular backside of a business bag or a handheld bag. The power-receiving device 1*e* may be in any form that is movable, apart from a bag. For example, the power-receiving device 1*e* may be configured to place a multi-antenna on a side surface of a mobile telephone.

In addition, it is also possible to dispose the power-receiving device 1 at four corners of a desk. It is also possible to dispose the power-receiving device 1 on a side surface, a ceiling or a floor of a room in which a desk is placed.

As described above, the power-receiving device 1, 1*a* to 1*e* is capable of wirelessly transmitting energy to a PC (which is an abbreviation of personal computer), a sensor, an actuator, a robot, an apparatus or the like, by using the WPT.

Also, a target to be supplied with electric power may be a cellular phone, a PDA (which is an abbreviation of personal digital assistants), a wireless microphone, a wireless USB, a wireless theater, a wireless TV, a wireless camera, a wireless headphone, a wireless mouse, a wireless keyboard, a wireless router, a wireless printer, or the like.

The power-receiving device 1, 1*a* to 1*e* is capable of being wired to any one of these targets. At the time, any kind of power storage device or the like may be interposed between them. Furthermore, the power-receiving device 1, 1*a* to 1*e* is capable of being integrated with any one of these targets.

As illustrated in FIG. 1 (B), the power-receiving device 1, 1*a* to 1*e* may have a main body configured in a flexible sheet-like shape or any other shape, and the multi-antenna 10, 10', 10" may be disposed on the FPC 4 which is included in the main body.

The flexible substrate is capable of being freely bent or folded, and of having a circuit pattern thereon. The flexible substrate is also called FPC (which is an abbreviation of Flexible Printed Circuit). Alternatively, it may be FFC (which is an abbreviation of Flexible Flat Cable) in which a wire can be formed without having a component thereon.

As illustrated in FIG. 1 (B), in the present embodiment, the multi-antenna 10, 10', 10" is disposed on the substrate 4, (for example, on the flexible substrate 4). The flexible substrate 4 may include the FPC and/or the FFC.

With referring to FIG. 21, the FPC and the FFC are shown in comparison, with regard to the flexible substrate 4, from the viewpoints of the appearance, the shape, the component mounting/pattern, the Shape changeable, the cost, and the lead time. As can be seen from this figure, the FPC and the FFC have their respective advantages and disadvantages. In the present example, the FPC and/or the FFC can be used depending on the environment for implementation.

Please notice that the shape, the size, the material, and the like of the substrate for disposing the multi-antenna 10, 10', 10" can be optionally selected in the present embodiment.

The way of attaching of the FPC or the FFC can arbitrarily be carried out in the main body or the housing of the power-receiving device 1. For example, a solder bonding, a connector mounting, a Copper foil tape adhesive, or the like can be used for attaching it thereto.

The solder bonding has an advantage of high mass productivity, but there is a problem that degradation of the substrate due to heat at the time of solder bonding may occur.

The connector mounting has an advantage of easily reconfiguring, but there is a problem that the thickness is likely to be increased due to a connector to be used.

The Copper foil tape adhesive has the advantage of being made to be thin and not be heated, but there is a problem in the mass productivity.

The present embodiment is capable of adapting any one of these methods depending on the environment for implementation.

As described above, one or a plurality of multi-antennas according to the present embodiments have been described with referring to the figures. However, please notice that the present embodiments are not limited to the illustrated embodiments.

For example, the multi-antennas according to the present embodiments can be combined with a cover (also called a radome) for protecting the antennas.

In addition, it is possible to provide a metal plate behind the antennas within the radome to increase directivities of the antennas by generating reflected waves at the metal plate.

Furthermore, in the present embodiment, it is also possible to provide one or a plurality of metal plates on a ceiling surface and/or a wall surface, etc., in an inside of a room to generate a state of reflection at the metal plates.

In addition, in the above description, the dipole antenna has been described as a preferred example as a linear antenna. However, please notice that the present embodiment is not limited to the illustrated embodiments.

For example, a part of the multi-antenna or a plurality of the multi-antennas according to the present embodiment may be replaced with another linear conductor(s) such as a bow-tie dipole(s), a monopole antenna(s), or an inverted F-type antenna(s), or a combination thereof.

Furthermore, all elements of the multi-antenna according to the present embodiment do not necessarily have to be composed of the straight linear antennas. In the multi-antenna according to the present embodiment, a part of the multi-antenna or a plurality of the multi-antennas may be replaced with a meander line antenna(s) which is bent in a zigzag manner or an antenna arrangement(s) having a star shape extending radially from a nearly single point, or a combination thereof.

Further, a part of the multi-antenna or a plurality of the multi-antennas according to the present embodiment may be replaced with an antenna(s) using the concept of metamaterial, or a combination of normal material and metamaterial. The term "metamaterial" refers to an artificial medium that periodically arranges regular structures of metals, dielectrics, or magnetic materials to artificially produce characteristic physical phenomena related with wavelengths of electromagnetic waves.

Furthermore, please notice that any device or the like can be added to the multi-antenna according to the present embodiment in order to improve a flow of balanced current. For example, any device or the like (for example, such as a spertopf or a BALUN) that has been employed in a conventional technique of antennas may be added in some embodiments.

In the above description, the power reception of the energy that is wirelessly transmitted is particularly concerned, but the method of performing the communication can be conducted arbitrary. Please notice that any manner of communication may be employed, such as, wireless LAN, Blue tooth (registered trademark) or the like.

The present invention is not limited to the above-described embodiments, and includes various modifications. For example, the above-mentioned embodiments have been described in detail for the purpose of illustrating the present invention in an easy-to-understand manner, and are not necessarily limited to those having all the described configurations. Also, it is possible to replace a part of the configuration of one embodiment with the configuration of another embodiment, and it is also possible to add the configuration of another embodiment to the configuration of one embodiment. Further, it is possible to add, delete, or replace a part of the configuration of each embodiment with other configuration.

In addition, control lines and information lines considered to be necessary for explanation are illustrated. Not all control lines and information lines for implementation of the product are necessarily illustrated. In practice, almost all of the configurations may be considered to be interconnected with each other.

It should be noted that the above-described embodiments disclose at least the configurations described in the claims.

SIGN DESCRIPTION

1 . . . Power-receiving device, 4 . . . Substrate or FPC, 10, 10', 10" . . . Multi-antenna, 11 to 24 . . . . Linear antenna (or Dipole antenna), 30, 40 . . . Connecting line (DC connecting line), 110, 110', 120 . . . Flexible substrate

What is claimed is:

1. An antenna system, comprising:

a substrate;

a first set of antenna elements comprising two antennas extending in different directions from an intersection; and a connecting line provided along a bisector of an inner angle formed by the two antennas of the first set of antenna elements in case where the connecting line is passing between the two antennas of the first set of antenna elements, and the connecting line is connected to a rectifier, wherein the antennas are connected to the connecting line via the rectifier.

2. The antenna system according to claim 1, further comprising:

a total of two antennas provided in a substantially cross shape to define four regions on the substrate; and a total of eight antennas that form a substantially cross shape in each of the four regions, wherein the connecting line is provided to connect all of the ten antennas in a substantially loop shape in a clockwise or anti-clockwise direction.

3. The antenna system according to claim 2, wherein the substantially cross shapes in the four regions are arranged in the four regions such that the substantially cross shapes have a substantially identical inclination angle with regard to the substrate, and that the connecting line is vertically and/or horizontally symmetrical with respect to the substrate.

4. The antenna system according to claim 2, wherein the substantially cross shapes in the four regions are arranged in the four regions such that the substantially cross shapes have a substantially non-identical inclination angle with regard to the substrate in order to increase a directivity of the antennas in comparison with a case where the inclination angles are substantially identical.

5. The antenna system according to claim 4, wherein the substantially cross shapes are arranged in the four regions such that inclination angles gradually increase or decrease by 22.5 or 18 degrees with regard to the substrate when seen in a clockwise or anti-clockwise direction.

6. The antenna system according to claim 1, further comprising:

a second set of antenna elements comprising two antennas extending in different directions from a second intersection, wherein the connecting line is connected to the two antennas of the second set of antenna elements along a bisector of an inner angle formed by the two antennas of the second set of antenna elements.

7. The antenna system according to claim 6, wherein the connecting line is provided among three of the antennas of the first set of antenna elements and the second set of antenna elements to pass through an inner center regarding inner angles of a triangle formed by the three of the antennas.

8. The antenna system according to claim 7, wherein positions of a total of eight inner centers are uniquely defined as intersection points between a single circle defined on the substrate and a single square shape defined on the substrate.

9. The antenna system according to claim 8, wherein a total of eight antennas define a square shape that is inclined at an angle of 45 degrees with respect to a total of two antennas provided in a substantially cross shape at a substantially center of the substrate, and wherein an outline of the connecting line is uniquely defined to pass through positions of vertices of the square shape inclined at an angle of 45 degrees, positions of centers of sides of the square shape, and positions of the inner centers.

10. The antenna system according to claim 8, wherein a total of eight antennas define a square shape that is inclined at an angle of 45 degrees with respect to a total of two antennas provided in a substantially cross shape at a substantially center of the substrate, and wherein the connecting line is defined to pass through the inner centers and to alternately pass an inner side and an outer side of the square shape inclined at an angle of 45 degrees.

11. The antenna system according to claim 1, wherein at least two connecting lines are allowed to be attached by using a polygonal-shaped interface substrate for enabling arrangement of a plurality of two-terminal connectors.

12. The antenna system according to claim 11, wherein in the interface substrate, neighboring two of the plurality of two-terminal connectors form a uniform angle of 22.5 degrees or 18 degrees.

13. The antenna system according to claim 11, wherein the interface substrate has a main body having a substantially quadrangular shape.

14. A power-receiving device for receiving energy wirelessly transmitted in a three-dimensional space, according to a wireless power transmission (WPT), the device comprising:

a main body;

one or more of the antenna systems according to claim 1, wherein the one or more of multi-antennas are accommodated in the main body; and a circuit for enabling the one or more of multi-antennas to function, wherein the circuit is accommodated in the main body.

15. The power-receiving device according to claim 14, wherein the main body has a shape of a sheet having flexibility, and the antennas systems are provided on a flexible substrate.

16. The power-receiving device according to claim 14, wherein the main body has a shape of a polyhedron having at least two surfaces, and one of the antenna systems is arranged on each of the at least two surfaces.

* * * * *